United States Patent
Liu

(10) Patent No.: US 9,749,216 B2
(45) Date of Patent: Aug. 29, 2017

(54) METHOD FOR ACQUIRING CONTENT, USER EQUIPMENT AND CACHE NODE

(71) Applicant: Huawei Technologies Co., Ltd., Shenzhen (CN)

(72) Inventor: Shucheng Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 148 days.

(21) Appl. No.: 14/692,473

(22) Filed: Apr. 21, 2015

(65) Prior Publication Data

US 2015/0229558 A1 Aug. 13, 2015

Related U.S. Application Data

(63) Continuation of application No. PCT/CN2013/080901, filed on Aug. 6, 2013.

(30) Foreign Application Priority Data

Oct. 22, 2012 (CN) .......................... 2012 1 0404745

(51) Int. Cl.
*H04L 12/721* (2013.01)
*H04L 29/08* (2006.01)
*H04L 12/733* (2013.01)

(52) U.S. Cl.
CPC ............ *H04L 45/12* (2013.01); *H04L 45/122* (2013.01); *H04L 45/72* (2013.01); *H04L 67/2842* (2013.01)

(58) Field of Classification Search
CPC ....... H04L 45/12; H04L 45/122; H04L 45/72; H04L 67/2842
See application file for complete search history.

(56) References Cited

U.S. PATENT DOCUMENTS

| | | |
|---|---|---|
| 7,181,523 B2 | 2/2007 | Sim |
| 7,565,450 B2 | 7/2009 | Garcia-Luna-Aceves et al. |
| 2005/0044270 A1 | 2/2005 | Grove et al. |
| 2008/0313350 A1 | 12/2008 | Swinton et al. |
| 2009/0175172 A1 | 7/2009 | Prytz et al. |
| 2010/0113019 A1 | 5/2010 | Jeong et al. |

FOREIGN PATENT DOCUMENTS

| | | |
|---|---|---|
| CN | 1852264 A | 10/2006 |
| CN | 101218794 A | 7/2008 |
| CN | 101741736 A | 6/2010 |
| CN | 101860550 A | 10/2010 |
| EP | 1 324 546 A1 | 7/2003 |

*Primary Examiner* — Pao Sinkantarakorn
*Assistant Examiner* — Kabir Jahangir
(74) *Attorney, Agent, or Firm* — Brinks Gilson & Lione

(57) ABSTRACT

The present disclosure discloses a method for acquiring a content, a user equipment and a cache node. The method includes: a user equipment requests a target content from a management node; receives a first probe packet and a second probe packet, the first probe packet includes an identifier of a fragment of the target content and a shortest distance from the fragment to the user equipment on a first path, and the second probe packet includes the identifier of the fragment of the target content and a shortest distance from the fragment to the user equipment on a second path; determines an optimal path according to the shortest distance from the fragment to the user equipment on the first path and the shortest distance from the fragment to the user equipment on the second path; and sends a second acquiring request used for acquiring the fragment through the optimal path.

12 Claims, 14 Drawing Sheets

METHOD FOR ACQUIRING CONTENT, USER EQUIPMENT AND CACHE NODE

CROSS-REFERENCE TO RELATED APPLICATIONS

This application is a continuation of International Application No. PCT/CN2013/080901, filed on Aug. 6, 2013, which claims priority to Chinese Patent Application No. 201210404745.5, filed on Oct. 22, 2012, both of which are hereby incorporated by reference in their entireties.

TECHNICAL FIELD

The present disclosure relates to a field of communication technologies, and in particular, to a method for acquiring a content, a user equipment and a cache node.

BACKGROUND

With the continuous development of the scale and technology of the Internet, the Internet has become a main channel of people for acquiring an information content. For example: people watch videos, read news, acquire pictures and the like via the Internet. With the increase of the frequency and the quantity of people of acquiring a content via the Internet, a pressure of data transmission over the Internet increases accordingly, so as to affect efficiency of people of acquiring data from the Internet. Hence, how to efficiently acquire the content from the Internet becomes a topic with growing concerns.

The inventor has found in a long-term study that the efficiency of acquiring the content may be improved by establishing a dedicated system network, such as CDN (Content Delivery Network) and P2P (Peer-to-Peer). However, in the CDN system network, a dedicated content cache node needs to be configured to achieve the storage of the content and the quick acquisition of the content, thus the configuration cost thereof is quite high; and in the P2P system network, different parts of the same content need to be concurrently acquired from different peers by means of the calculation, storage and bandwidth resources of a common user and collaboration of the peers and by utilizing a k-anycast (k order anycast technology) technology, so as to realize quick acquisition of the content and load balancing of the peers, but the P2P system network does not know the position information of the network or the node, thus the content can not be acquired nearby.

Quick acquisition of the content may also be achieved by means of the calculation and storage capacity of a router in the network. The router may intercept a content acquiring request of the user and reposition the request of the user on an optimal storage device or a cache device, but in this manner, only single storage device or single cache device is selected to provide the service content and could not concurrently acquire different parts of the content. Since the router needs to reposition the request, the existence of the cache needs to be notified by utilizing a manner similar to flooding or a router advertisement, but since the dynamic nature of the cache is high, routing convergence is slow and communication cost is high.

SUMMARY

The technical problem mainly solved by embodiments of the present disclosure includes a method for acquiring a content, a user equipment and a cache node, which may reduce forwarding times of a fragment in a network, reduce consumption of a bandwidth of the network and decrease access delay of the user equipment.

In a first aspect, a method for acquiring a content is included, including:

sending, by a user equipment, a first acquiring request used for requesting a target content to a management node;

receiving, by the user equipment, a first probe packet sent by a first storage node determined by the management node, where the first probe packet includes an identifier of a fragment of the target content and a shortest distance from the fragment to the user equipment on a first path, and the first path is a path through which the first probe packet passes;

receiving, by the user equipment, a second probe packet sent by a second storage node determined by the management node, where the second probe packet includes the identifier of the fragment and a shortest distance from the fragment to the user equipment on a second path, and the second path is a path through which the second probe packet passes;

determining, by the user equipment, an optimal path according to the shortest distance from the fragment to the user equipment on the first path and the shortest distance from the fragment to the user equipment on the second path, where the optimal path is a path of the first path and the second path; and sending, by the user equipment, a second acquiring request used for acquiring the fragment through the optimal path.

In the first possible implementation manner according to the first aspect, the first probe packet further includes a quantity of fragments on the first path;

the second probe packet further includes a quantity of fragments on the second path;

the determining, by the user equipment, the optimal path according to the shortest distance from the fragment to the user equipment on the first path and the shortest distance from the fragment to the user equipment on the second path, includes:

acquiring, by the user equipment, a first probability of the fragment according to the shortest distance from the fragment to the user equipment on the first path and the quantity;

acquiring, by the user equipment, a second probability of the fragment according to the shortest distance from the fragment to the user equipment on the second path and the quantity; and determining, by the user equipment, the optimal path according to the first probability and the second probability.

In the second possible implementation manner of the first aspect according to the first possible implementation manner of the first aspect, the determining, by the user equipment, the optimal path according to the first probability and the second probability, includes:

judging, by the user equipment, whether the first probability is less than the second probability, if the first probability is greater than the second probability, determining the first path as the optimal path, and if the first probability is less than the second probability, determining the second path as the optimal path.

In the third possible implementation manner of the first aspect according to the first possible implementation manner of the first aspect, the determining, by the user equipment, the optimal path according to the first probability and the second probability, includes:

judging, by the user equipment, whether the first probability is greater than the second probability;

if the first probability is greater than the second probability, judging, by the user equipment, whether a first load is less than a first limit value, if the first load is less than the first limit value, determining the first path as the optimal path, and if the first load is greater than or equal to the first limit value, determining the second path as the optimal path, where the first limit value is a maximum quantity of fragments of the target content acquired from the first path, and the first load is a quantity of fragments of the target content acquired from the first path;

if the first probability is less than the second probability, judging, by the user equipment, whether a second load is less than a second limit value, if the second load is less than the second limit value, determining the second path as the optimal path, and if the second load is greater than or equal to the second limit value, determining the first path as the optimal path, where the second limit value is a maximum quantity of fragments of the target content acquired from the second path, and the second load is a quantity of fragments of the target content acquired from the second path.

In the fourth possible implementation manner of the first aspect according to the first possible implementation manner of the first aspect, the first probability is acquired in the following calculation manner:

$$p_1^i = 1 \Big/ \left( \frac{w_d \sum_i d_1^i}{w_n \sum_i n_1^i} \right), \sum_i n_j^i \neq 0$$

where the $p_1^i$ is the first probability, the i is a serial number of the fragment and the i is a natural number, the $w_d$ is a weight of the shortest distance from the fragment to the user equipment, the $d_1^i$ is a shortest distance from a fragment i to the user equipment on the first path, the $w_n$ is a weight of the quantity of fragments, and the $n_1^i$ is the quantity of fragments i on the first path; and the second probability is acquired in the following calculation manner:

$$p_2^i = 1 \Big/ \left( \frac{w_d \sum_i d_2^i}{w_n \sum_i n_2^i} \right), \sum_i n_j^i \neq 0$$

where the $p_2^i$ is the second probability, the i is a serial number of the fragment and the i is a natural number, the $w_d$ is the weight of the shortest distance from the fragment to the user equipment, the $d_2^i$ is a shortest distance from the fragment i to the user equipment on the second path, the $w_n$ is the weight of the quantity of fragments, and the $n_2^i$ is the quantity of fragments i on the second path.

In the fifth possible implementation manner of the first aspect according to the first possible implementation manner of the first aspect, the first probe packet further includes a cache time of the fragment on the first path, and the second probe packet further includes a cache time of the fragment on the second path;

the acquiring, by the user equipment, the first probability of the fragment according to the shortest distance from the fragment to the user equipment on the first path and the quantity, includes:

acquiring, by the user equipment, the first probability of the fragment according to the shortest distance from the fragment to the user equipment on the first path, the quantity and the cache time;

the acquiring, by the user equipment, the second probability of the fragment according to the shortest distance from the fragment to the user equipment on the second path and the quantity, includes:

acquiring, by the user equipment, the second probability of the fragment according to the shortest distance from the fragment to the user equipment on the second path, the quantity and the cache time.

In the sixth possible implementation manner of the first aspect according to the fifth possible implementation manner of the first aspect, the first probability is acquired in the following calculation manner:

$$p_1^i = w_d^j \left( \frac{1}{d_1^i} \right) + w_n^j n_1^i + w_t^j \left( \frac{1}{t_1^i} \right) + c,$$

$$d_1^i \neq 0, t_1^i \neq 0$$

where the $p_1^i$ is the first probability, the i is a serial number of the fragment of the target content and the i is a natural number, the $w_d^j$ is a weight of a shortest distance from a fragment i to the user equipment, the $d_1^i$ is a shortest distance from the fragment i to the user equipment on the first path, the $w_n^i$ is a weight of a quantity of fragments i, and the $n_1^i$ is the quantity of fragments i on the first path; the $t_1^i$ is a cache time of the fragment i on the first path, the $w_t^i$ is a weight of the cache time of the fragment i, and the c is a weighting coefficient; and the second probability is acquired in the following calculation manner:

$$p_2^i = w_d^j \left( \frac{1}{d_2^i} \right) + w_n^j n_2^i + w_t^j \left( \frac{1}{t_2^i} \right) + c,$$

$$d_2^i \neq 0, t_2^i \neq 0$$

where the $p_2^i$ is the second probability, the i is a serial number of the fragment of the target content and the i is a natural number, the $w_d^j$ is the weight of the shortest distance from the fragment i to the user equipment, the $d_2^i$ is a shortest distance from the fragment i to the user equipment on the second path, the $w_n^i$ is the weight of the quantity of the fragments i, the $n_2^i$ is the quantity of fragments i on the second path, the $t_2^i$ is a cache time of the fragment i on the second path, the $w_t^i$ is a weight of the cache time of the fragment i, and the c is a weighting coefficient.

In a second aspect, a method for acquiring a content is included, including:

receiving, by a cache node, a probe packet from a storage node;

inquiring, by the cache node, whether a first fragment of a target content which the probe packet requests to probe is cached locally;

if the first fragment is cached, writing a new first distance in the probe packet, where the new first distance is a shortest distance from the first fragment to the cache node;

receiving, by the cache node, a second acquiring request generated by a user equipment according to the probe packet, where the second acquiring request includes a first fragment request identifier used for indicating that the first fragment is requested;

sending, by the cache node, the first fragment to the user equipment according to the second acquiring request, and updating the second acquiring request; and forwarding, by the cache node, an updated second acquiring request.

In the first possible implementation manner of the second aspect according to the second aspect, the writing the new first distance in the probe packet, includes:

writing a preset initial value in the probe packet as the new first distance.

In the second possible implementation manner of the second aspect according to the second aspect or the first possible implementation manner of the second aspect, the writing, by the cache node, the new first distance in the probe packet, includes:

writing, by the cache node, the new first distance and a new first quantity in the probe packet, where the new first quantity is the sum of an old first quantity carried in the probe packet and 1, and the first quantity is a quantity of first fragments; or, writing, by the cache node, the new first distance, a new first quantity and a first cache time in the probe packet, where the new first quantity is the sum of an old first quantity carried in the probe packet and 1, the first quantity is a quantity of first fragments, and the first cache time is a time period when the cache node caches a first fragment.

In the third possible implementation manner of the second aspect according to the second aspect or the first possible implementation manner of the second aspect, when the probe packet further requests to probe a second fragment and the cache node does not cache the second fragment, the method further includes:

writing, by the cache node, a new second distance in the probe packet.

In the fourth possible implementation manner of the second aspect according to the third possible implementation manner of the second aspect, the new second distance is the sum of an old second distance carried in the probe packet and a constant, the old second distance is a shortest distance from the second fragment to an upstream neighboring node of the cache node on a path through which the probe packet passes along a downlink direction, and the downlink direction is a direction from the storage node to the user equipment.

In the fifth possible implementation manner of the second aspect according to any of the second aspect to the fourth possible implementation manner of the second aspect, the updating the second acquiring request, includes:

deleting, by the cache node, the first fragment request identifier; or, setting, by the cache node, the first fragment request identifier as invalid.

In the third aspect, a user equipment is included, including:

a first sending module, configured to send a first acquiring request used for requesting a target content to a management node;

a first receiving module, configured to receive a first probe packet sent by a first storage node determined by the management node, where the first probe packet includes an identifier of a fragment of the target content and a shortest distance from the fragment to the user equipment on a first path, and the first path is a path through which the first probe packet passes;

a second receiving module, configured to receive a second probe packet sent by a second storage node determined by the management node, where the second probe packet includes the identifier of the fragment and a shortest distance from the fragment to the user equipment on a second path, and the second path is a path through which the second probe packet passes;

a selecting module, configured to determine an optimal path according to the shortest distance from the fragment to the user equipment on the first path and the shortest distance from the fragment to the user equipment on the second path, where the optimal path is a path of the first path and the second path; and a second sending module, configured to send a second acquiring request used for acquiring the fragment through the optimal path.

In the first possible implementation manner of the third aspect according to the third aspect, the first probe packet further includes a quantity of fragments on the first path;

the second probe packet further includes a quantity of fragments on the second path;

the selecting module includes a first calculating unit, a second calculating unit and a selecting unit;

the first calculating unit is configured to acquire a first probability of the fragment according to the shortest distance from the fragment to the user equipment on the first path and the quantity;

the second calculating unit is configured to acquire a second probability of the fragment according to the shortest distance from the fragment to the user equipment on the second path and the quantity; and the selecting unit is configured to determine the optimal path according to the first probability and the second probability.

In the second possible implementation manner of the third aspect according to the first possible implementation manner of the third aspect, the selecting unit is specifically configured to judge whether the first probability is greater than the second probability, if the first probability is greater than the second probability, determine the first path as the optimal path, and if the first probability is less than the second probability, determine the second path as the optimal path.

In the third possible implementation manner of the third aspect according to the first possible implementation manner of the third aspect, the selecting unit includes a first judging unit, a first selecting unit and a second selecting unit;

the first judging unit is configured to judge whether the first probability is greater than the second probability;

the first selecting unit is configured to, when the first probability is greater than the second probability, judge whether a first load is less than a first limit value, if the first load is less than the first limit value, determine the first path as the optimal path, and if the first load is greater than or equal to the first limit value, determine the second path as the optimal path, where the first limit value is a maximum quantity of fragments of the target content acquired from the first path, and the first load is a quantity of fragments of the target content acquired from the first path;

the second selecting unit is configured to, when the first probability is less than or equal to the second probability, judge whether a second load is less than a second limit value, if the second load is less than the second limit value, determine the second path as the optimal path, and if the second load is greater than or equal to the second limit value, determine the first path as the optimal path, where the second limit value is a maximum quantity of fragments of the target content acquired from the second path, and the second load is a quantity of fragments of the target content acquired from the second path.

In the fourth possible implementation manner of the third aspect according to the first possible implementation manner of the third aspect, the first probability is acquired in the following calculation manner:

$$p_1^i = 1 \Big/ \left( \frac{w_d \sum_i d_1^i}{w_n \sum_i n_1^i} \right), \sum_i n_j^i \neq 0$$

where the $p_1^i$ is the first probability, the i is a serial number of the fragment and the i is a natural number, the $w_n$ is a weight of the quantity of fragments, the $w_d$ is a weight of the shortest distance from the fragment to the user equipment, the $d_1^i$ is a shortest distance from a fragment i to the user equipment on the first path, and the $n_1^i$ is the quantity of fragments i on the first path; and the second probability is acquired by the following calculation method:

$$p_2^i = 1 \Big/ \left( \frac{w_d \sum_i d_2^i}{w_n \sum_i n_2^i} \right), \sum_i n_j^i \neq 0$$

where the $p_2^i$ is the second probability, the i is a serial number of the fragment and the i is a natural number, the $w_d$ is the weight of the shortest distance from the fragment to the user equipment, the $d_2^i$ is a shortest distance from the fragment i to the user equipment on the second path, the $w_n$ is the weight of the quantity of fragments, and the $n_2^i$ is the quantity of fragments i on the second path.

In the fifth possible implementation manner of the third aspect according to the first possible implementation manner of the third aspect, the first probe packet further includes a cache time of the fragment on the first path, and the second probe packet further includes a cache time of the fragment on the second path;

the first calculating unit is specifically configured to acquire the first probability of the fragment according to the shortest distance from the fragment to the user equipment on the first path, the quantity and the cache time;

the second calculating unit is specifically configured to acquire the second probability of the fragment according to the shortest distance from the fragment to the user equipment on the second path, the quantity and the cache time.

In the sixth possible implementation manner of the third aspect according to the fifth possible implementation manner of the third aspect, the first probability is acquired in the following calculation manner:

$$p_1^i = w_d^i \left( \frac{1}{d_1^i} \right) + w_n^i n_1^i + w_t^i \left( \frac{1}{t_1^i} \right) + c,$$

$$d_1^i \neq 0, t_1^i \neq 0$$

where the $p_1^i$ is the first probability, the i is a serial number of the fragment of the target content and the i is a natural number, the $w_d^i$ is a weight of a shortest distance from a fragment i to the user equipment, the $d_1^i$ is a shortest distance from the fragment i to the user equipment on the first path, the $w_n^i$ is a weight of a quantity of fragments i, and the $n_1^i$ is the quantity of fragments i on the first path; the $t_1^i$ is a cache time of the fragment i on the first path, the $w_t^i$ is a weight of the cache time of the fragment i, and the c is a weighting coefficient; and the second probability is acquired in the following calculation manner:

$$p_2^i = w_d^i \left( \frac{1}{d_2^i} \right) + w_n^i n_2^i + w_t^i \left( \frac{1}{t_2^i} \right) + c,$$

$$d_2^i \neq 0, t_2^i \neq 0$$

where the $p_2^i$ is the second probability, the i is a serial number of the fragment of the target content and the i is a natural number, the $w_d^i$ is the weight of the shortest distance from the fragment i to the user equipment, the $d_2^i$ is a shortest distance from the fragment i to the user equipment on the second path, the $w_n^i$ is the weight of the quantity of the fragments i, the $n_2^i$ is the quantity of fragments i on the second path, the $w_t^i$ is a weight of the cache time of the fragment i, the $t_2^i$ is a cache time of the fragment i on the second path, and the c is a weighting coefficient.

In the fourth aspect, a cache node is included, including:
a first receiving module, configured to receive a probe packet from a storage node;
an inquiring module, configured to inquire whether a first fragment of a target content which the probe packet requests to probe is cached locally;
a first writing module, configured to, when the inquiring module inquires that the first fragment is cached locally, write a new first distance in the probe packet, where the new first distance is a shortest distance from the first fragment to the cache node;
a second receiving module, configured to receive a second acquiring request generated by a user equipment according to the probe packet, where the second acquiring request includes a first fragment request identifier used for indicating that the first fragment is requested;
a sending module, configured to send the first fragment to the user equipment according to the second acquiring request;
an updating module, configured to update the second acquiring request after the sending module sends the first fragment; and
a forwarding module, configured to forward an updated second acquiring request.

In the first possible implementation manner of the fourth aspect according to the fourth aspect, the new first distance is a preset initial value.

In the second possible implementation manner of the fourth aspect according to the fourth aspect or the first possible implementation manner of the fourth aspect, the first writing module is specifically configured to write the new first distance and a new first quantity in the probe packet, the new first quantity is the sum of an old first quantity carried in the probe packet and 1, and the first quantity is a quantity of first fragments; or, write the new first distance, a new first quantity and a first cache time in the probe packet, where the new first quantity is the sum of an old first quantity carried in the probe packet and 1, the first quantity is a quantity of first fragments, and the first cache time is a time period when the cache node caches a first fragment.

In the third possible implementation manner of the fourth aspect according to the fourth aspect or the first possible implementation manner of the fourth aspect, the probe packet further includes a second writing module;

the second writing module is configured to write a new second distance in the probe packet, when the probe packet further requests to probe a second fragment and the cache node does not cache the second fragment, where the new second distance is a shortest distance from the second fragment to the cache node.

In the fourth possible implementation manner of the fourth aspect according to the third possible implementation manner of the fourth aspect, the new second distance is the sum of an old second distance carried in the probe packet and a constant, the old second distance is a shortest distance from the second fragment to an upstream neighboring node of the cache node on a path through which the probe packet passes along a downlink direction, and the downlink direction is a direction from the storage node to the user equipment.

In the fifth possible implementation manner of the fourth aspect according to any of the fourth aspect to the fourth possible implementation manner of the fourth aspect, the updating module is specifically configured to delete the first fragment request identifier, or set the first fragment request identifier as invalid.

Beneficial effects of the embodiments of the present disclosure are: different from the condition in the prior art, the user equipment respectively receives different probe packets from different paths, where the probe packets carry the shortest distances from the fragment to the user equipment, moreover, the user equipment determines the optimal path according to the shortest distances of the fragment on the different paths and acquires the fragment from the optimal path, so as to reduce the forwarding times of the fragment in the network, thus effectively reducing the consumption of the bandwidth of the network and decreasing the access delay of the user equipment.

DESCRIPTION OF EMBODIMENTS

The present disclosure will be described below in detail in combination with accompanying drawings and embodiments.

Figure 1:
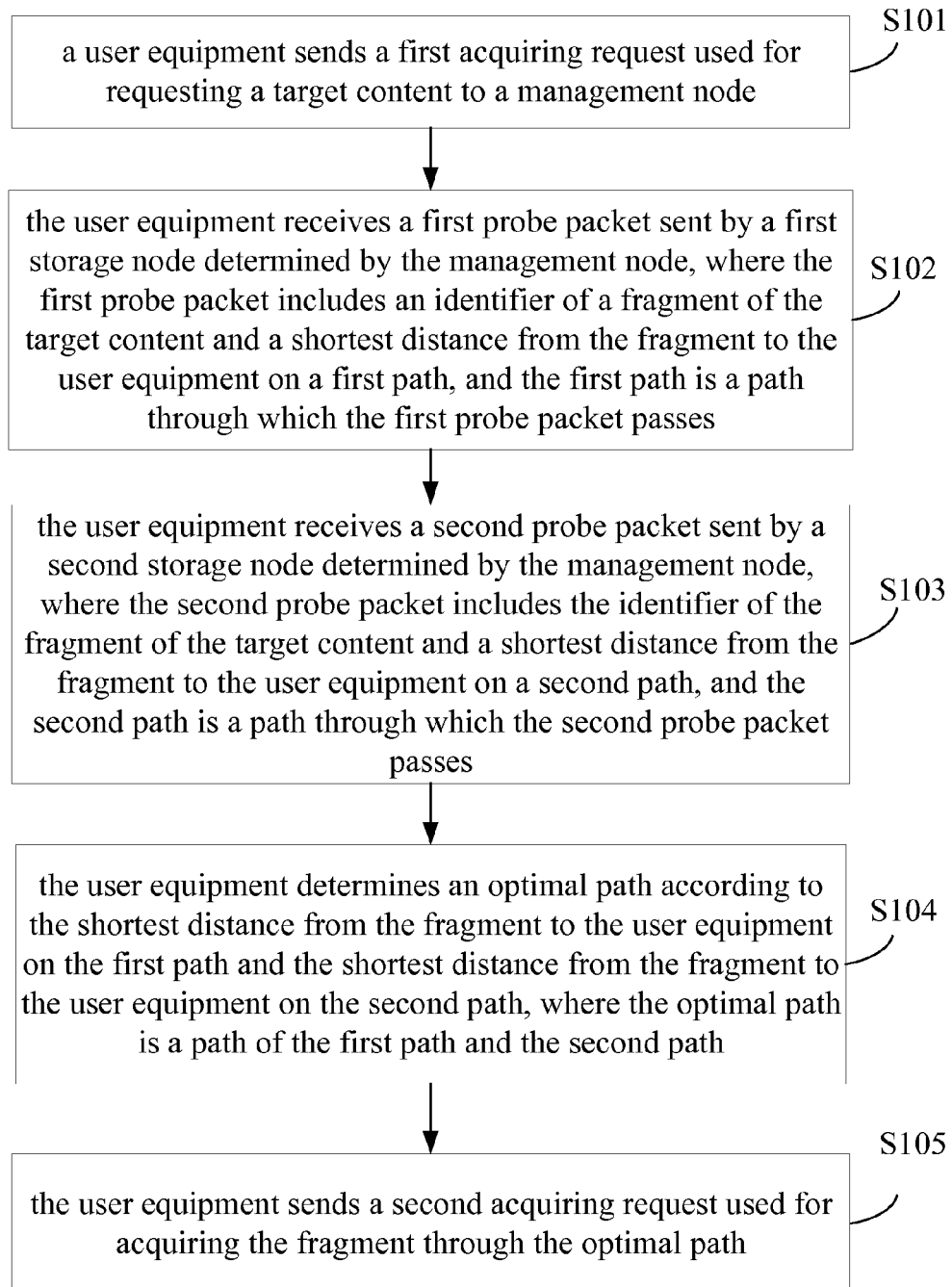
FIG. 1 is a flowchart of embodiment 1 of a method for acquiring a content of the present disclosure.

Please see FIG. 1. FIG. 1 is a schematic flowchart of embodiment 1 of a method for acquiring a content of the present disclosure. As shown in the figure, the method includes:

step S101: a user equipment sends a first acquiring request used for requesting a target content to a management node.

The management node is used for managing all storage nodes in its address field, and may select a proper storage node providing service for the user equipment according to a request of the user equipment and select a proper path from the storage node to the user equipment at the same time.

Step S102: the user equipment receives a first probe packet sent by a first storage node determined by the management node, where the first probe packet includes an identifier of a fragment of the target content and a shortest distance from the fragment to the user equipment on a first path, and the first path is a path through which the first probe packet passes.

The storage node is used for storing the target content. The storage node may be a device only having a storage function, and may also be a device having a storage function and a forwarding function, such as a storage router. The first path is a path from the first storage node to the user equipment, where the first path and the first storage node are acquired by the management node by utilizing a K order anycast method. The K order anycast method is a method for selecting an optimal node providing service, where besides the K order anycast method, the management node may further select the first storage node in combination with a principle of proximity, a load balancing principle or a path separation principle. After selecting the first storage node, the management node sends a notification to the first storage node to instruct the first storage node to send the first probe packet to the user equipment through the first path. The shortest distance from the fragment to the user equipment is the sum of a product and an initial value, where the product is a product of the least routing and forwarding times which the fragment needs to experience to reach the user equipment and a constant, where the value of the constant could not be 0. For example, a fragment A needs to experience at least two times of routing and forwarding to reach the user equipment, the initial value is 0, and the constant is set as 1, then the shortest distance from the fragment A to the user equipment is 2. The initial value is the shortest value of the shortest distance from the fragment to the user equipment, and the value of the shortest distance from the fragment to the user equipment is the initial value when the fragment is at an initial point.

Step S103: the user equipment receives a second probe packet sent by a second storage node determined by the management node, where the second probe packet includes the identifier of the fragment of the target content and a shortest distance from the fragment to the user equipment on a second path, and the second path is a path through which the second probe packet passes.

The second path is a path from the second storage node to the user equipment. The second path and the second storage node are acquired by the management node by utilizing the K order anycast method, moreover, after selecting the second storage node, the management node sends a notification to the second storage node to instruct the second storage node to send the second probe packet to the user equipment along the second path.

Step S104: the user equipment determines an optimal path according to the shortest distance from the fragment to the user equipment on the first path and the shortest distance from the fragment to the user equipment on the second path, where the optimal path is a path of the first path and the second path.

The optimal path is a path preferably selected by the user equipment for acquiring the fragment, for example, when the first path is the optimal path, the user equipment acquires the fragment from the first path.

Step S105: the user equipment sends a second acquiring request used for acquiring the fragment through the optimal path.

The second acquiring request includes related information of the fragment, such as the identifier and the like. After receiving the second acquiring request, a cache node or a storage node on the optimal path sends the fragment to the user equipment according to the second acquiring request.

In the embodiment of the present disclosure, the user equipment receives the first probe packet and the second probe packet from the first path and the second path respectively, where the first probe packet includes the shortest distance from the fragment to the user equipment on the first path, and the second probe packet includes the shortest distance from the fragment to the user equipment on the second path, moreover, the user equipment determines the optimal path according to the shortest distances of the fragment on the first path and the second path, and the user equipment acquires the fragment from the optimal path, so as to reduce forwarding times of the fragment in the network, thus effectively reducing consumption of a bandwidth of the network and decreasing access delay of the user equipment.

Figure 2:
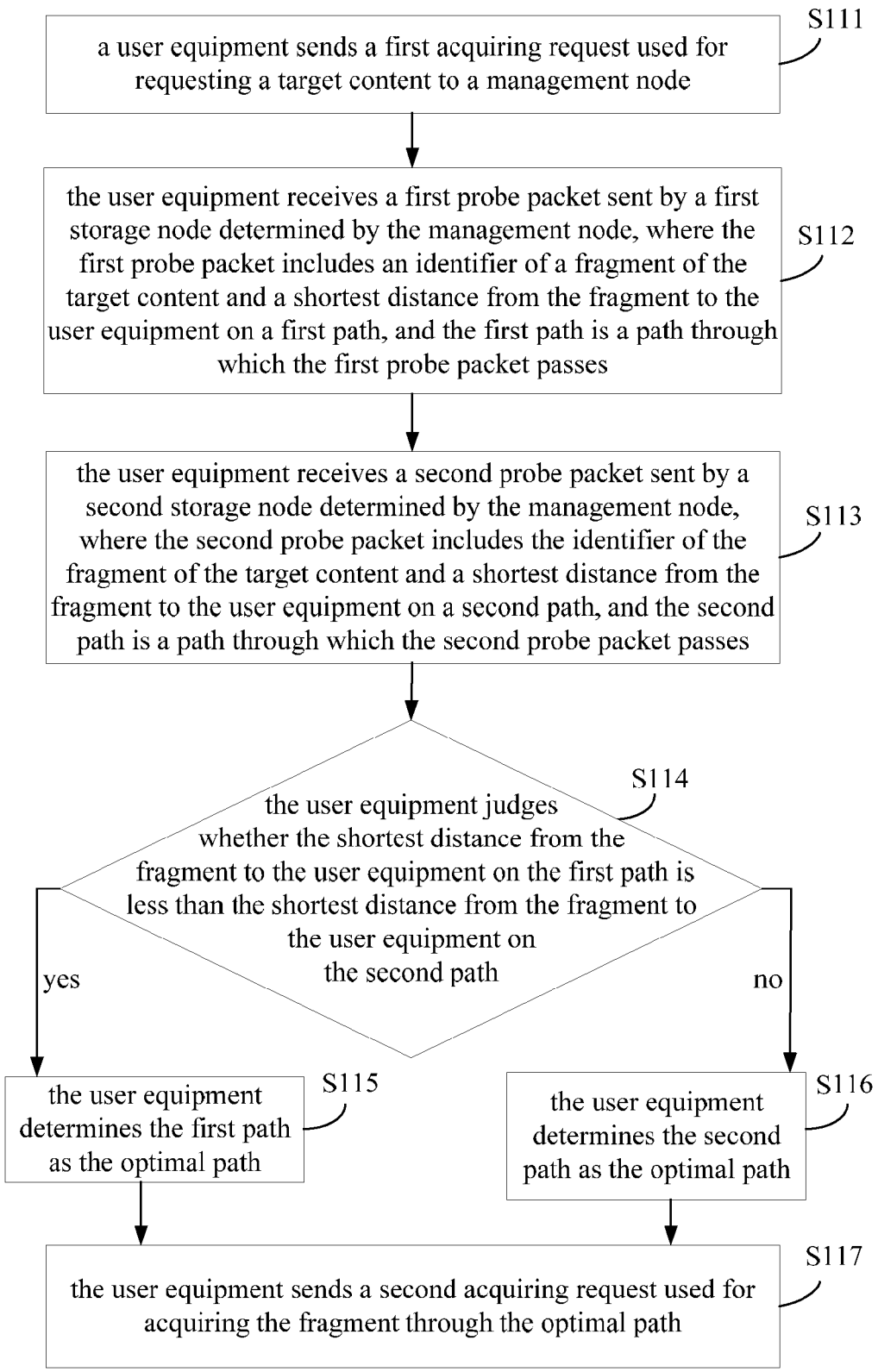
FIG. 2 is a flowchart of embodiment 2 of a method for acquiring a content of the present disclosure.

Please see FIG. 2. FIG. 2 is embodiment 2 of a method for acquiring a content of the present disclosure. As shown in the figure, the method includes:

step S111: a user equipment sends a first acquiring request used for requesting a target content to a management node.

The management node is used for managing all storage nodes in its address field. The management node acquires contents stored in the storage nodes and positions of the storage nodes by receiving registration of the storage nodes in the address field. A storage node is a device used for storing a target content.

Step S112: the user equipment receives a first probe packet sent by a first storage node determined by the management node, where the first probe packet includes an identifier of a fragment of the target content and a shortest distance from the fragment to the user equipment on a first path, and the first path is a path through which the first probe packet passes.

The first path is a path from the first storage node to the user equipment. After selecting the first storage node and the first path by utilizing a K order anycast method according to the first acquiring request of the user equipment, the management node sends a notification to the first storage node to instruct the first storage node to generate the first probe packet and send the first probe packet to the user equipment through the first path. The shortest distance from the fragment to the user equipment is the sum of a product and an initial value, where the product is a product of the least routing and forwarding times which the fragment of the target content needs to experience to reach the user equipment and a constant, where the constant could not be 0, and the initial value may be set as 0 or other constants.

Step S113: the user equipment receives a second probe packet sent by a second storage node determined by the management node, where the second probe packet includes the identifier of the fragment of the target content and a shortest distance from the fragment to the user equipment on a second path, and the second path is a path through which the second probe packet passes;

The second path is a path from the second storage node to the user equipment. Similarly, after selecting the second storage node and the second path by utilizing the K order anycast method, the management node notifies the second storage node to send the second probe packet to the user equipment along the second path.

Step S114: the user equipment judges whether the shortest distance from the fragment to the user equipment on the first path is less than the shortest distance from the fragment to the user equipment on the second path, if so, entering step S115, if not, entering step S116.

Figure 3:
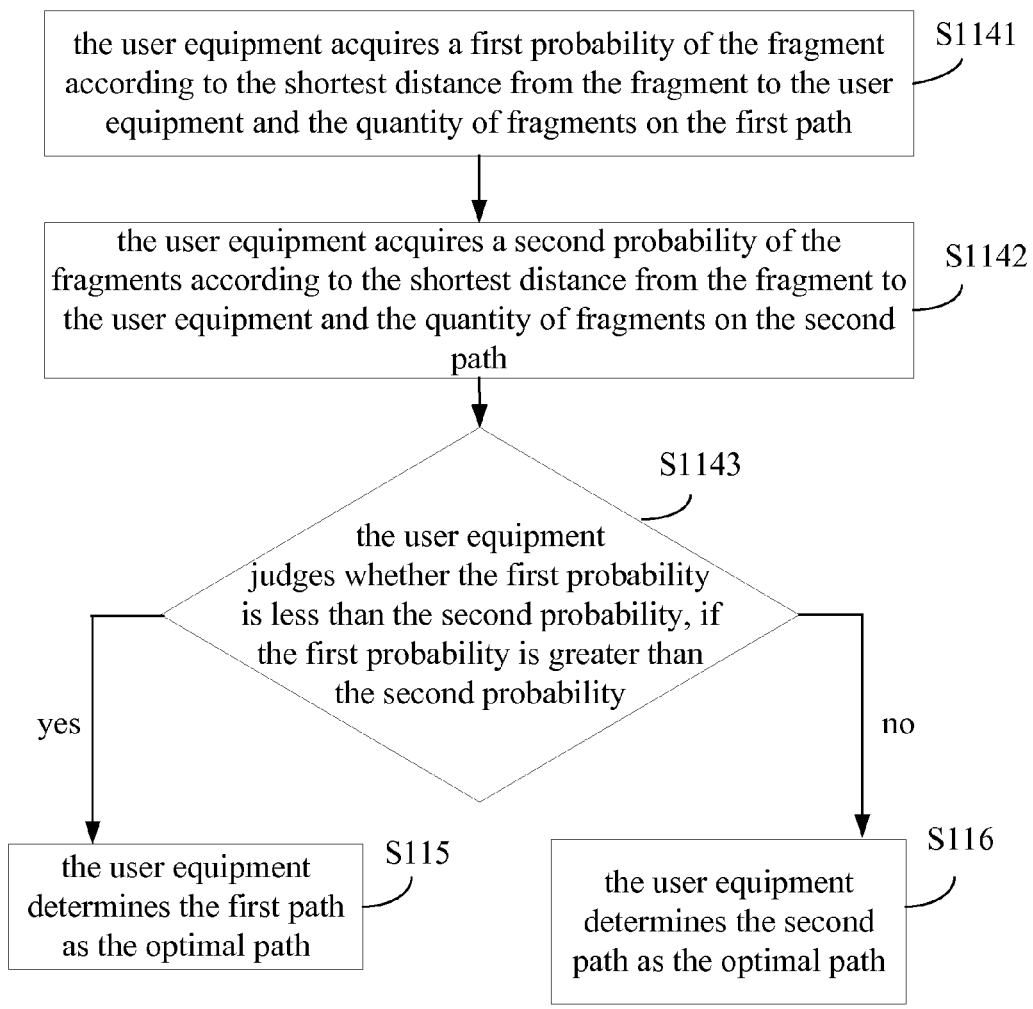
FIG. 3 is a flowchart of selecting an optimal path in embodiment 2 of the method for acquiring the content of the present disclosure.

Besides probing the shortest distance of the fragment on the first path, the first probe packet may also probe a quantity of fragments on the first path. Similarly, besides probing the shortest distance of the fragment on the second path, the second probe packet may also probe a quantity of fragments on the second path. As shown in FIG. 3, step S114 may further include:

substep S1141: the user equipment acquires a first probability of the fragment according to the shortest distance from the fragment to the user equipment and the quantity of fragments on the first path, where the first probability is acquired in the following calculation manner.

$$p_1^i = 1 \bigg/ \left( \frac{w_d \sum_i d_1^i}{w_n \sum_i n_1^i} \right), \sum_i n_j^i \neq 0$$

where the $p_1^i$ is the first probability, the i is a serial number of the fragment and the i is a natural number, the $w_n$ is a weight of the quantity of fragments, the $w_d$ is a weight of the shortest distance from the fragment to the user equipment, the $d_1^i$ is a shortest distance from a fragment i to the user equipment on the first path, and the $n_1^i$ is the quantity of fragments i on the first path.

Besides probing the shortest distance and the quantity of the fragments on the first path, the first probe packet may further probe a cache time of the fragment on the first path. The cache time is a time period from a time point of caching the fragment by a cache node to a time point of receiving the probe packet by the cache node on a path. The substep S1141 may also include: the user equipment acquires the first probability of the fragment according to the shortest distance from the fragment to the user equipment, the quantity of fragments and the cache time on the first path, where the first probability is acquired in the following calculation manner:

$$p_1^i = w_d^j\left(\frac{1}{d_1^i}\right) + w_n^j n_1^i + w_t^j\left(\frac{1}{t_1^i}\right) + c,$$

$$d_1^i \neq 0, t_1^i \neq 0$$

where the $p_1^i$ is the first probability, the i is a serial number of the fragment of the target content and the i is a natural number, the $w_d^i$ is a weight of a shortest distance from a fragment i to the user equipment, the $d_1^i$ is a shortest distance from the fragment i to the user equipment on the first path, the $w_n^i$ is a weight of a quantity of fragments i, and the $n_1^i$ is the quantity of fragments i on the first path; the $t_1^i$ is a cache time of the fragment i on the first path, the $w_t^i$ is a weight of the cache time of the fragment i, and the c is a weighting coefficient.

Substep S1142: the user equipment acquires a second probability of the fragments according to the shortest distance from the fragment to the user equipment and the quantity of fragments on the second path, where the second probability is acquired in the following calculation manner:

$$p_2^i = 1 / \left(\frac{w_d \sum_i d_2^i}{w_n \sum_i n_2^i}\right), \sum_i n_j^i \neq 0$$

where the $p_2^i$ is the second probability, the i is a serial number of the fragment and the i is a natural number, the $d_2^i$ is a shortest distance from the fragment i to the user equipment on the second path, the $n_2^i$ is the quantity of fragments i on the second path, the $w_n$ is the weight of the quantity of fragments, and the $w^d$ is the weight of the shortest distance from the fragment to the user equipment.

Similarly, besides probing the shortest distance and the quantity of the fragments on the second path, the second probe packet may further probe a cache time of the fragment on the second path, then the substep S1142 includes:

the user equipment acquires the second probability of the fragment according to the shortest distance from the fragment to the user equipment, the quantity of fragments and the cache time on the second path, where the second probability is acquired in the following calculation manner:

$$p_2^i = w_d^j\left(\frac{1}{d_2^i}\right) + w_n^j n_2^i + w_t^j\left(\frac{1}{t_2^i}\right) + c,$$

$$d_2^i \neq 0, t_2^i \neq 0$$

where the $p_2^i$ is the second probability, the $d_2^i$ is a shortest distance from the fragment i to the user equipment on the second path, the $w_d^i$ is the weight of the shortest distance from the fragment i to the user equipment, the $n_2^i$ is the quantity of fragments i on the second path, the $w_n^i$ is the weight of the quantity of the fragments i, the $t_2^i$ is a cache time of the fragment i on the second path, the $w_t^i$ is a weight of the cache time of the fragment i, the i is a serial number of the fragment of the target content and the i is a natural number, and the c is a weighting coefficient.

Substep S1143: the user equipment judges whether the first probability is less than the second probability, if the first probability is greater than the second probability, entering step S115, if not, entering step S116.

Figure 4:
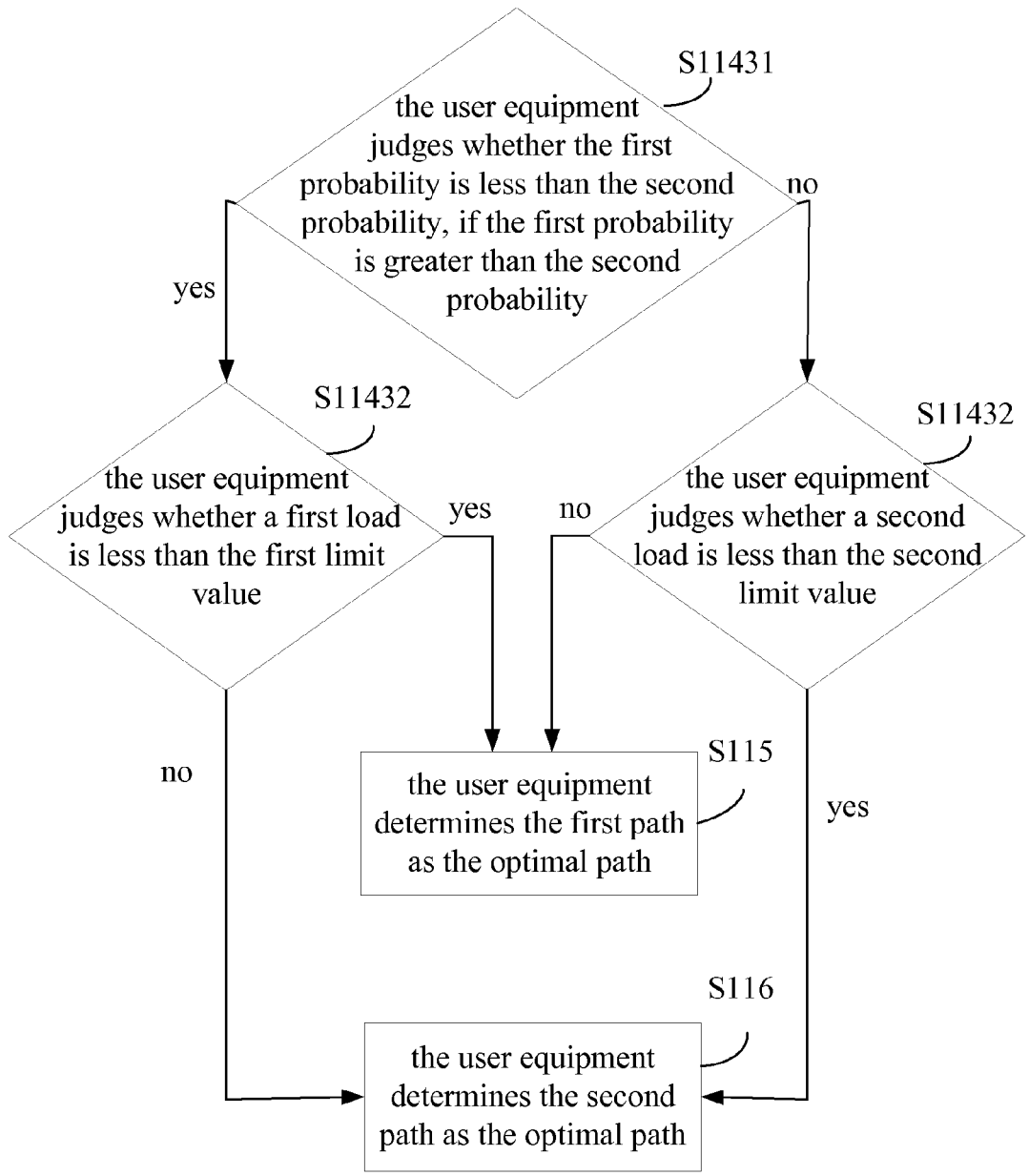
FIG. 4 is a flowchart of selecting an optimal path in combination with load balancing in embodiment 2 of the method for acquiring the content of the present disclosure.

Moreover, besides determining the optimal path according to the first probability and the second probability, the user equipment may further determine the optimal path in combination with load balancing and multipath principles, in order to balance loads of paths and improve an efficiency of acquiring the fragment. In the embodiment of the present disclosure, a first limit value and a second limit value may be set for the first path and the second path respectively, where the first limit value is a maximum quantity of fragments of the target content acquired from the first path, and the second limit value is a maximum quantity of fragments of the target content acquired from the second path. For example, a quantity of fragments of the target content is 6, and then the first limit value is set as 3 and the second limit value is set as 3 respectively according to an average method. As shown in FIG. 4, substep S1143 may also include:

substep S11431: the user equipment judges whether the first probability is less than the second probability, if the first probability is greater than the second probability, entering substep S11432, if not, entering substep S11433;

substep S11432: the user equipment judges whether a first load is less than the first limit value, if the first load is less than the first limit value, entering step S115, and if the first load is greater than or equal to the first limit value, entering step S116, where the first load is a quantity of fragments of the target content acquired from the first path;

substep S11433: if the first probability is less than or equal to the second probability, the user equipment judges whether a second load is less than the second limit value, if the second load is less than the second limit value, entering step S116, and if the second load is greater than or equal to the second limit value, entering step S115, where the second load is a quantity of fragments of the target content acquired from the second path.

When the user equipment determines the first path as the optimal path, correspondingly, the user equipment adds 1 to the first load, and when the user equipment determines the second path as the optimal path, correspondingly, the user equipment adds 1 to the second load.

Step S115: the user equipment determines the first path as the optimal path.

Step S116: the user equipment determines the second path as the optimal path.

Step S117: the user equipment sends a second acquiring request used for acquiring the fragment through the optimal path.

The cache node or the storage node on the optimal path sends the fragment to the user equipment according to the second acquiring request.

In the embodiment of the present disclosure, the user equipment respectively receives the first probe packet and the second probe packet from the first path and the second path, where the first probe packet is used for probing the shortest distance from the fragment to the user equipment on the first path, and the second probe packet is used for probing the shortest distance from the fragment to the user equipment on the second path, moreover, the user equipment determines the optimal path according to the shortest distances of the fragment on the first path and the second path and acquires the fragment from the optimal path, so as to reduce forwarding times of the fragment in the network, thus effectively reducing consumption of a bandwidth of the network and decreasing access delay of the user equipment. Moreover, the user equipment may further acquire different fragments from different paths in combination with the load balancing principle, to balance the loads of the paths, improve efficiency of acquiring the fragment, and further reduce the access delay of the user equipment.

Figure 5:
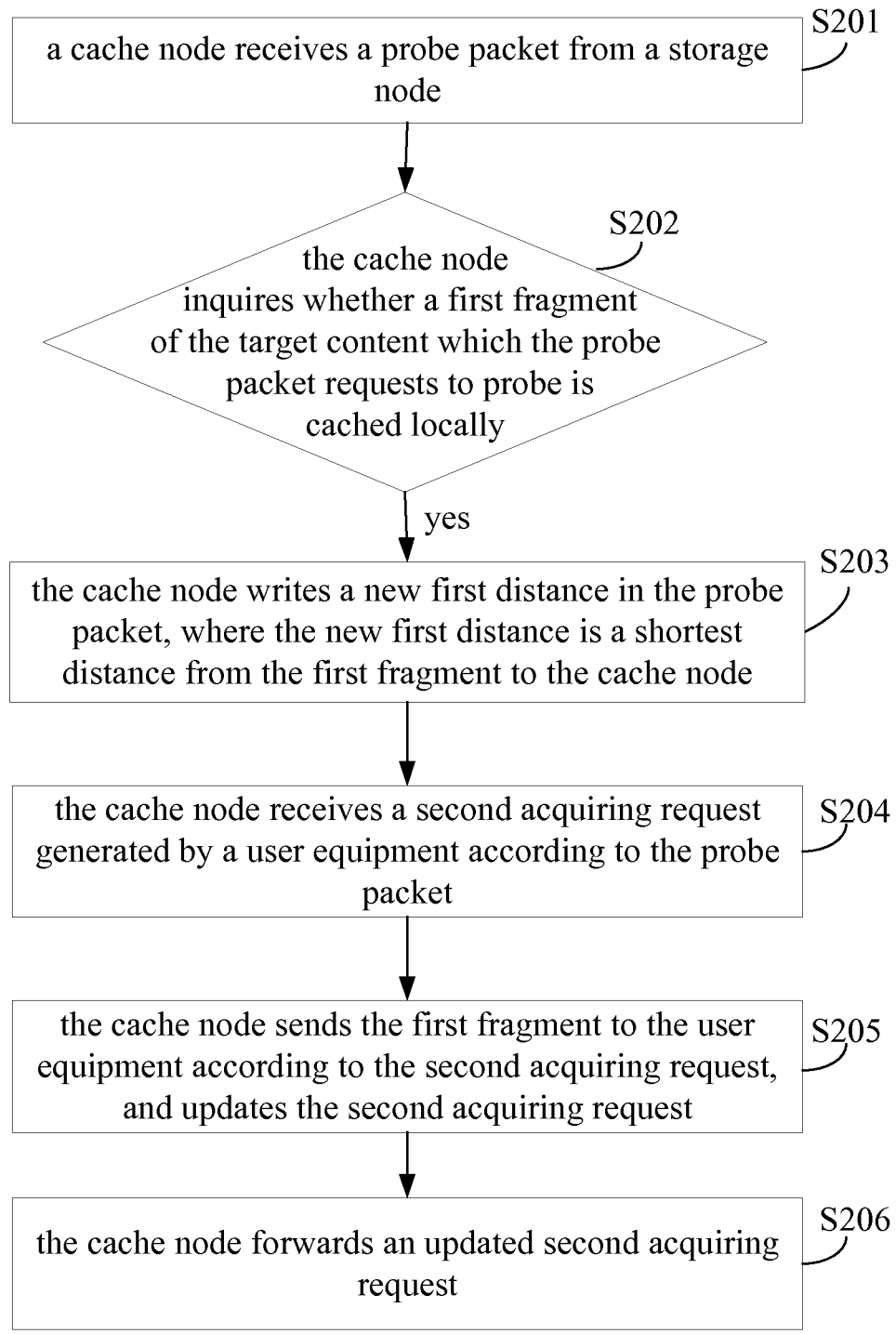
FIG. 5 is a schematic flowchart of embodiment 3 of a method for acquiring a content of the present disclosure.

Please see FIG. 5. FIG. 5 is a schematic flowchart of embodiment 3 of a method for acquiring a content of the present disclosure. As shown in the figure, the method includes:

step S201: a cache node receives a probe packet from a storage node.

The cache node is used for temporarily storing a fragment of a target content, and the cache node has a function of forwarding the fragments of the target content. When forwarding the fragments of the target content, the cache node may select a proper fragment from the forwarded fragments of the target content according to an LRU (Least Recently Used) algorithm, and store the fragment in a local memory of the cache node, to update a content stored in the cache node. The storage node is used for storing a fragment of the target content.

Step S202: the cache node inquires whether a first fragment of the target content which the probe packet requests to probe is cached locally, if the first fragment is cached, entering step S203.

Step S203: the cache node writes a new first distance in the probe packet, where the new first distance is a shortest distance from the first fragment to the cache node.

The shortest distance from the fragment to the cache node is the sum of a product and an initial value, where the product is a product of the least routing and forwarding times which the fragment needs to experience to reach the cache node and a constant, and the constant could not be 0. For example, the fragment reaches a cache node C after passing through a cache node A and a cache node B in sequence, the initial value is 0, and the constant is 1, at this time, the shortest distance from the fragment to the cache node A is 2. As the fragment is located at the cache node C at this time, namely, the fragment may reach the cache node C without routing and forwarding, that is to say, the cache node C is an initial point of the fragment, then at this time, the shortest distance from the fragment to the cache node C is the sum of 0 and the initial value. In the embodiment of the present disclosure, the cache node stores the first fragment, namely, the cache node may be the initial point of the first fragment, thus the least routing and forwarding times which the fragment needs to experience to reach the cache node is 0, and a preset initial value may be written in the probe packet to serve as the new first distance.

Step S204: the cache node receives a second acquiring request generated by a user equipment according to the probe packet, where the second acquiring request includes a first fragment request identifier used for indicating that the first fragment is requested.

In the embodiment of the present disclosure, the first fragment request identifier may be an identifier of the first fragment.

Step S205: the cache node sends the first fragment to the user equipment according to the second acquiring request, and updates the second acquiring request.

After sending the first fragment to the user equipment, the cache node updates the probe packet, so that a subsequent node does not send the first fragment to the user equipment in case of receiving the second acquiring request.

Step S206: the cache node forwards an updated second acquiring request.

The cache node forwards the updated second acquiring request to a next node, for enabling subsequent nodes to send other fragments which the second acquiring request requests to acquire to the user equipment.

In the embodiment of the present disclosure, the cache node receives the probe packet, and updates the probe packet for enabling the probe packet to probe the shortest distance of acquiring the fragment, so that the user equipment receives the probe packet, determines a optimal path according to the shortest distance of the fragment on the path and acquires the fragment from the optimal path, so as to reduce forwarding times of the fragment in the network, thus effectively reducing consumption of a bandwidth of the network and decreasing access delay of the user equipment.

Figure 6:
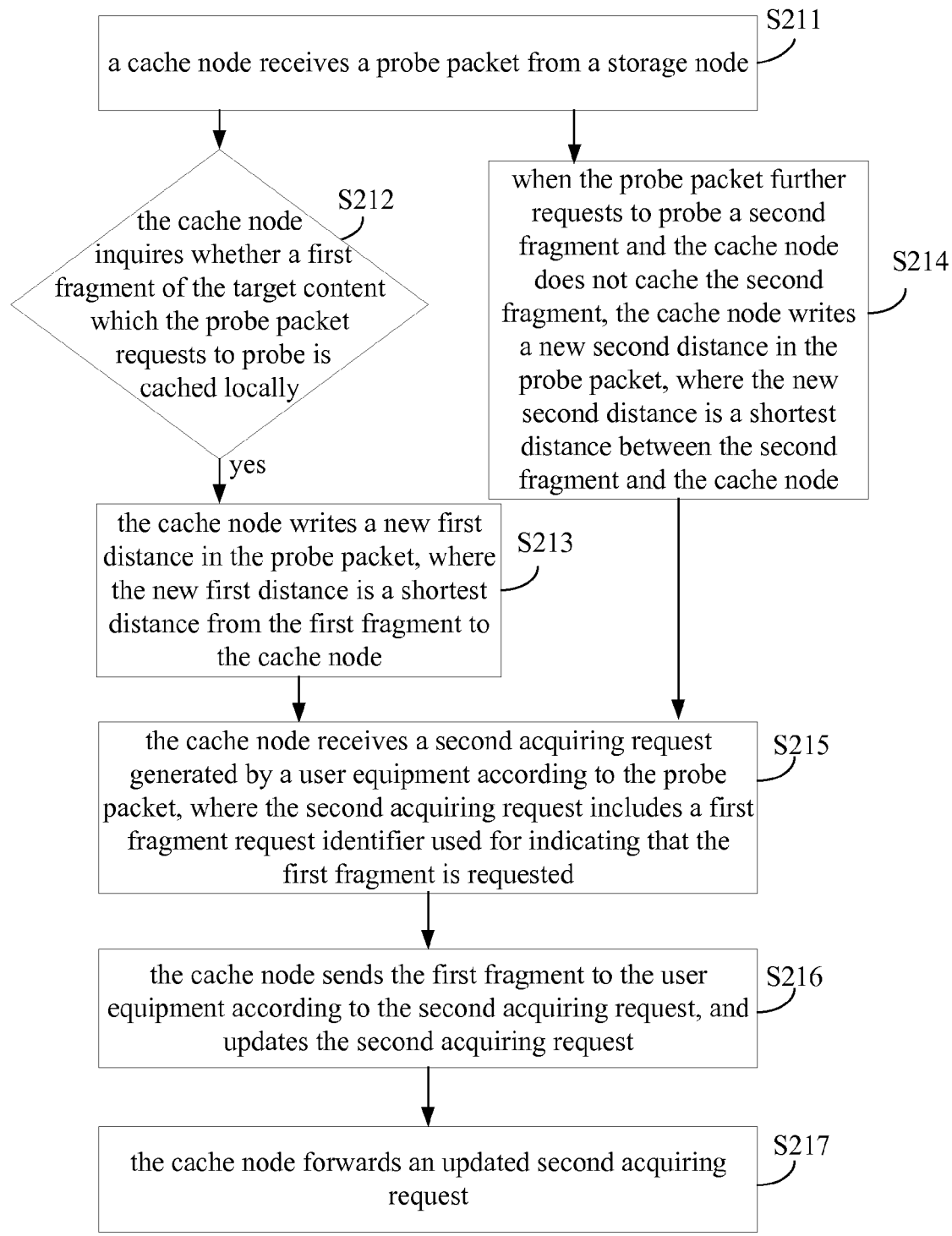
FIG. 6 is a schematic flowchart of embodiment 4 of a method for acquiring a content of the present disclosure.

Please see FIG. 6. FIG. 6 is a schematic flowchart of embodiment 4 of a method for acquiring a content of the present disclosure. As shown in the figure, the method includes:

Step S211: a cache node receives a probe packet from a storage node.

The cache node is a node having a forwarding function and a cache function, and when forwarding fragments of a target content, the cache node may update the fragments stored locally according to an LRU algorithm. The storage node is a node having a storage function.

Step S212: the cache node inquires whether a first fragment of the target content which the probe packet requests to probe is cached locally, if the first fragment is cached, entering step S213.

Step S213: the cache node writes a new first distance in the probe packet, where the new first distance is a shortest distance from the first fragment to the cache node.

The shortest distance from the fragment to the cache node is the sum of a product and an initial value, where the product is a product of the least routing and forwarding times which the fragment needs to experience to reach the cache node and a constant, and the value of the constant could not be 0. For example, the fragment reaches a cache node C after passing through a cache node A and a cache node B in sequence, the initial value is 0, at this time, the shortest distance from the fragment to the cache node A is 2. As the fragment is located at the cache node C at this time, namely, the fragment may reach the cache node C without routing and forwarding, that is to say, the cache node C is an initial point of the fragment, then at this time, the shortest distance from the fragment to the cache node C is the sum of 0 and the initial value. In the embodiment of the present disclosure, the cache node stores the first fragment, namely, the cache node may be the initial point of the first fragment, thus a preset initial value may be written in the probe packet to serve as the new first distance.

Optionally, besides probing the shortest distance of the first fragment, the probe packet may also be used for probing a quantity of first fragments on a path. Thus, step S213 may include: the cache node writes the new first distance and a new first quantity in the probe packet, where the new first quantity is the sum of an old first quantity carried in the probe packet and 1, and the first quantity is a quantity of first fragments.

Optionally, besides probing the shortest distance and the first quantity of the first fragments, the probe packet may also be used for probing a cache time of the first fragment on the path. Thus, step S213 may include: the cache node writes the new first distance, a new first quantity and a first cache time in the probe packet, where the new first quantity is the sum of an old first quantity carried in the probe packet and 1, the first quantity is a quantity of first fragments, and the first cache time is a time period when the cache node caches a first fragment.

Step S214: when the probe packet further requests to probe a second fragment and the cache node does not cache the second fragment, the cache node writes a new second distance in the probe packet, where the new second distance is a shortest distance between the second fragment and the cache node.

The new second distance is the sum of an old second distance carried in the probe packet and a constant, the old second distance is a shortest distance from the second fragment to an upstream neighboring node of the cache node on a path through which the probe packet passes along a downlink direction, and the downlink direction is a direction from the storage node to the user equipment. The neighboring node is a node storing the second fragment and closest to the current position of the second fragment on the path. For example, the probe packet reaches a cache node F after passing by a cache node A, a cache node B, a cache node C, a cache node D and a cache node E in sequence, if the cache node B and the cache node A store the second fragment, when the second fragment is located in the cache node E, the cache node B belongs to the upstream neighboring node, and the old second distance is the shortest distance between the second fragment and the cache node B. At this time, the second fragment reaches the cache node B by 4 routing and forwarding, thus, the old second distance is the sum of a product and the initial value, where the product is the product of the initial value, 4 and the constant.

Step S215: the cache node receives a second acquiring request generated by a user equipment according to the probe packet, where the second acquiring request includes a first fragment request identifier used for indicating that the first fragment is requested.

The first fragment request identifier may be an identifier of the first fragment.

Step S216: the cache node sends the first fragment to the user equipment according to the second acquiring request, and updates the second acquiring request.

After sending the first fragment to the user equipment, the cache node updates the second acquiring request, so that a subsequent node does not send the first fragment to the user equipment in the case of receiving the second acquiring request. In the embodiment of the present disclosure, a manner of updating the second acquiring request includes: the cache node deletes the first fragment request identifier, for example, the cache node deletes the identifier of the first fragment in the second acquiring request; or the cache node sets the first fragment request identifier as invalid, for example, the identifier of the first fragment is marked for indicating that the first fragment has been sent to the user equipment.

Step S217: the cache node forwards an updated second acquiring request.

The cache node forwards the updated second acquiring request to a next node along the path, for enabling subsequent nodes to send other fragments to the user equipment.

In the embodiment of the present disclosure, the cache node receives the probe packet, and updates the probe packet for enabling the probe packet to probe the shortest distance of acquiring the fragment, so that the user equipment receives the probe packet, determines a optimal path according to the shortest distance of the fragment on the path and acquires the fragment from the optimal path, so as to reduce forwarding times of the fragment in the network, thus effectively reducing consumption of a bandwidth of the network and decreasing access delay of the user equipment.

Figure 7:
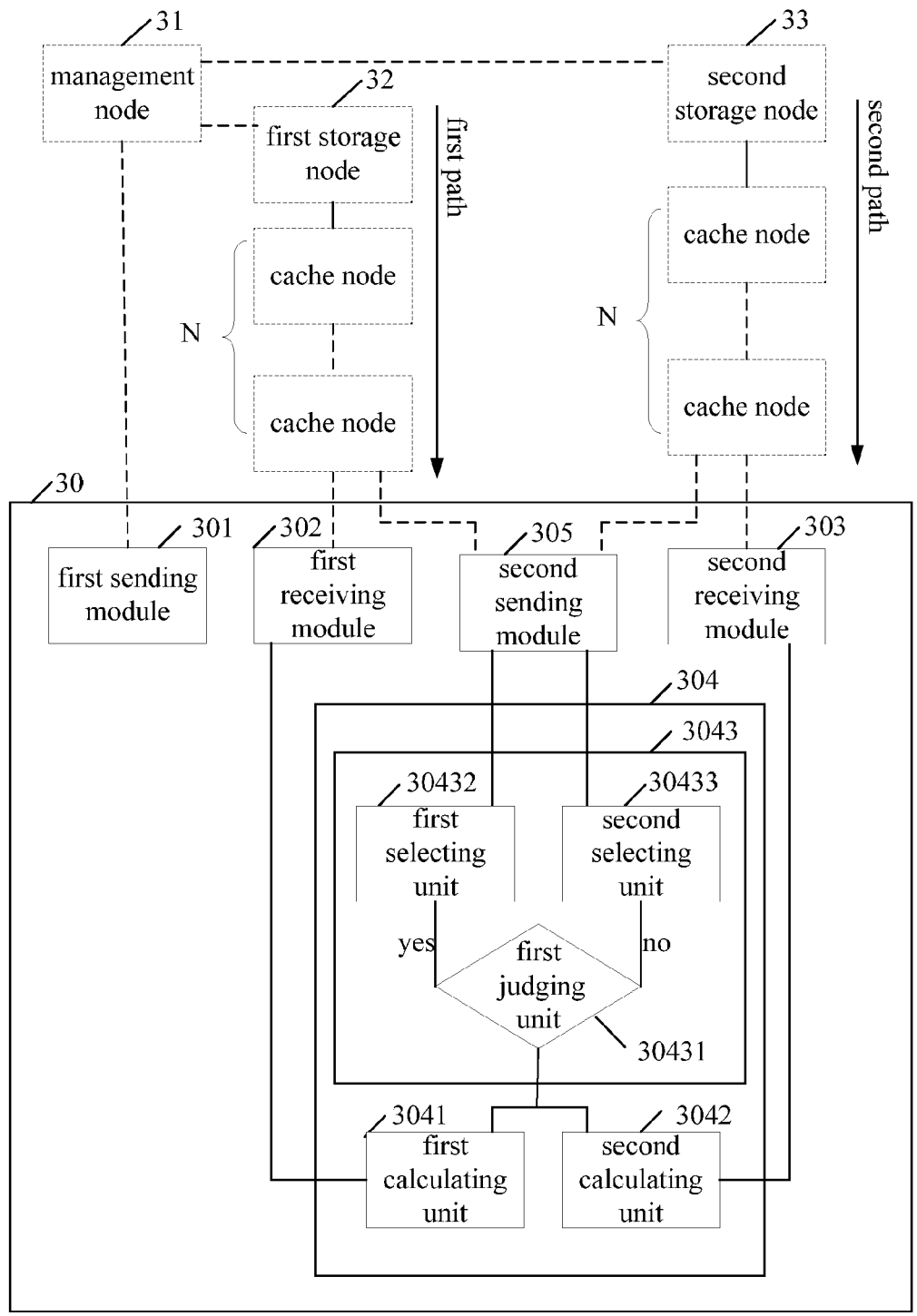
FIG. 7 is a schematic diagram of a structure of embodiment 1 of a user equipment of the present disclosure.

The present disclosure further provides a user equipment embodiment. Please see FIG. 7. FIG. 7 is a schematic diagram of a structure of embodiment 1 of a user equipment of the present disclosure. As shown in the figure, the user equipment 30 includes a first sending module 301, a first receiving module 302, a second receiving module 303, a selecting module 304 and a second sending module 305.

The first sending module 301 is configured to send a first acquiring request used for requesting a target content to a management node 31. The first acquiring request includes an address of the user equipment 30 and an identifier of the requested target content. The management node 31 manages all storage nodes in its address field, after receiving the first acquiring request of the user equipment 30, the management node 31 selects a first storage node 32, a first path, a second storage node 33 and a second path by utilizing a K order anycast method, the first path is a path from the first storage node 32 to the user equipment 30, and the second path is a path from the second storage node 33 to the user equipment 30. Meanwhile, the management node 31 notifies the first storage node 32 to send a first probe packet to the user equipment 30 through the first path and notifies the second storage node 33 to send a second probe packet to the user equipment 30 through the second path.

The first receiving module 302 is configured to receive the first probe packet sent by the first storage node 32 determined by the management node 31, where the first probe packet includes an identifier of a fragment of the target content and a shortest distance from the fragment to the user equipment 30 on the first path, and the first path is a path through which the first probe packet passed. The second receiving module 303 is configured to receive the second probe packet sent by the second storage node 33 determined by the management node 31, where the second probe packet includes the identifier of the fragment of the target content and a shortest distance from the fragment to the user equipment 30 on the second path, and the second path is a path through which the second probe packet passes. The shortest distance from the fragment to the user equipment 30 on the second path is the least routing and forwarding times which the fragment needs to experience to reach the user equipment 30.

The selecting module 304 is configured to determine an optimal path according to the shortest distance from the fragment to the user equipment 30 on the first path and the shortest distance from the fragment to the user equipment 30 on the second path, where the optimal path is a path of the first path and the second path.

Besides probing the shortest distance of the fragment on the first path, the first probe packet may also probe a quantity of fragments on the first path. Similarly, besides probing the shortest distance of the fragments on the second path, the second probe packet may also probe a quantity of fragments on the second path. Then, the selecting module 304 may further include a first calculating unit 3041, a second calculating unit 3042 and a selecting unit 3043.

The first calculating unit 3041 is configured to acquire a first probability of the fragment according to the shortest distance from the fragment to the user equipment 30 and the quantity of fragments on the first path, where the first probability is acquired in the following calculation manner:

$$p_2^i = 1 \bigg/ \left( \frac{w_d \sum_i d_1^i}{w_n \sum_i n_1^i} \right), \sum_i n_j^i \neq 0$$

where the $p_1^i$ is the first probability, the i is a serial number of the fragment and the i is a natural number, the $w_n$ is a weight of the quantity of fragments, the $w_d$ is a weight of the shortest distance from the fragment to the user equipment 30, the $d_1^i$ is a shortest distance from a fragment i to the user equipment 30 on the first path, and the $n_1^i$ is the quantity of fragments i on the first path.

Besides probing the shortest distance and the quantity of the fragments on the first path, the first probe packet may further probe a cache time of the fragment on the first path. The cache time is a time period from a time point of caching the fragment by a cache node to a time point of receiving the probe packet by the cache node on a path. The first calculating unit 3041 may be specifically configured to acquire the first probability of the fragment according to the shortest distance from the fragment to the user equipment 30, the quantity of fragments and the cache time on the first path where the first probability is acquired in the following calculation manner:

$$p_1^i = w_d^i\left(\frac{1}{d_1^i}\right) + w_n^i n_1^i + w_t^i\left(\frac{1}{t_1^i}\right) + c,$$

$$d_1^i \neq 0, t_1^i \neq 0$$

where the $p_1^i$ is the first probability, the i is a serial number of the fragment of the target content and the i is a natural number, the $w_d^i$ is a weight of a shortest distance from a fragment i to the user equipment 30, the $d_1^i$ is a shortest distance from the fragment i to the user equipment 30 on the first path, the $w_n^i$ is a weight of a quantity of fragments i, and the $n_1^i$ is the quantity of fragments i on the first path, the $t_1^i$ is a cache time of the fragment i on the first path, the $w_t^i$ is a weight of the cache time of the fragment i, and the c is a weighting coefficient.

The second calculating unit 3042 is configured to acquire a second probability of the fragment according to the shortest distance from the fragment to the user equipment 30 and the quantity of fragments on the second path, where the second probability is acquired in the following calculation manner:

$$p_2^i = 1 \Big/ \left(\frac{w_d \sum_i d_2^i}{w_n \sum_i n_2^i}\right), \sum_i n_j^i \neq 0$$

where the $p_2^i$ is the second probability, the i is a serial number of the fragment and the i is a natural number, the $d_2^i$ is a shortest distance from the fragment i to the user equipment 30 on the second path, the $w_d$ is the weight of the shortest distance from the fragment to the user equipment 30, the $n_2^i$ is the quantity of fragments i on the second path, and the $w_n$ is the weight of the quantity of fragments.

Similarly, besides probing the shortest distance and the quantity of the fragments on the second path, the second probe packet may further probe a cache time of the fragment on the second path, then the second calculating unit 3042 may be specifically configured to acquire the second probability of the fragment according to the shortest distance from the fragment to the user equipment 30, the quantity of fragments and the cache time on the second path, where the second probability is acquired in the following calculation manner:

$$p_2^i = w_d^i\left(\frac{1}{d_2^i}\right) + w_n^i n_2^i + w_t^i\left(\frac{1}{t_2^i}\right) + c,$$

$$d_2^i \neq 0, t_2^i \neq 0$$

where the $p_2^i$ is the second probability, the $d_2^i$ is a shortest distance from the fragment i to the user equipment 30 on the second path, the $w_d^i$ is the weight of the shortest distance from the fragment i to the user equipment 30, the $n_2^i$ is the quantity of fragments i on the second path, the $w_n^i$ is the weight of the quantity of the fragments i, the $t_2^i$ is a cache time of the fragment i on the second path, the $w_t^i$ is a weight of the cache time of the fragment i, the i is a serial number of the fragment of the target content and the i is a natural number, and the c is a weighting coefficient.

The selecting unit 3043 is configured to determine the optimal path according to the first probability and the second probability. In the embodiment of the present disclosure, a manner of the selecting unit 3043 for determining the optimal path is: judging whether the shortest distance from the fragment to the user equipment 30 on the first path is less than the shortest distance from the fragment to the user equipment 30 on the second path, if so, determining the first path as the optimal path, if not, determining the second path as the optimal path; or, the user equipment 30 further determines the optimal path in combination with load balancing and multipath principles, in order to balance loads of paths and improve an efficiency of acquiring the fragment. In the embodiment of the present disclosure, a first limit value and a second limit value may be set for the first path and the second path respectively, where the first limit value is a maximum quantity of fragments acquired from the first path, and the second limit value is a maximum quantity of fragments acquired from the second path. Then, the selecting unit 3043 may include a first judging unit 30431, a first selecting unit 30432 and a second selecting unit 30433.

The first judging unit 30431 is configured to judge whether the first probability is greater than the second probability.

The first selecting unit 30432 is configured to, when the first judging unit 30431 judges that the first probability is greater than the second probability, judge whether a first load is less than the first limit value, if so, determine the first path as the optimal path, if not, determine the second path as the optimal path, where the first load is a quantity of fragments of the target content acquired from the first path.

The second selecting unit 30433 is configured to, when the first judging unit 30431 judges that the first probability is less than or equal to the second probability, judge whether a second load is less than the second limit value, if so, determine the second path as the optimal path, if not, determine the first path as the optimal path, where the second load is a quantity of fragments of the target content acquired from the second path.

In the embodiment of the present disclosure, the first receiving module and the second receiving module respectively receive the first probe packet and the second probe packet, where the first probe packet carries the shortest distance from the fragment to the user equipment on the first path, the second probe packet carries the shortest distance from the fragment to the user equipment on the second path, the optimal path is determined according to the shortest distances of the fragment on the first path and the second path, and the fragment is acquired from the optimal path, so as to reduce forwarding times of the fragment in the network, thus effectively reducing consumption of a bandwidth of the network and decreasing access delay of the user equipment.

Figure 8:
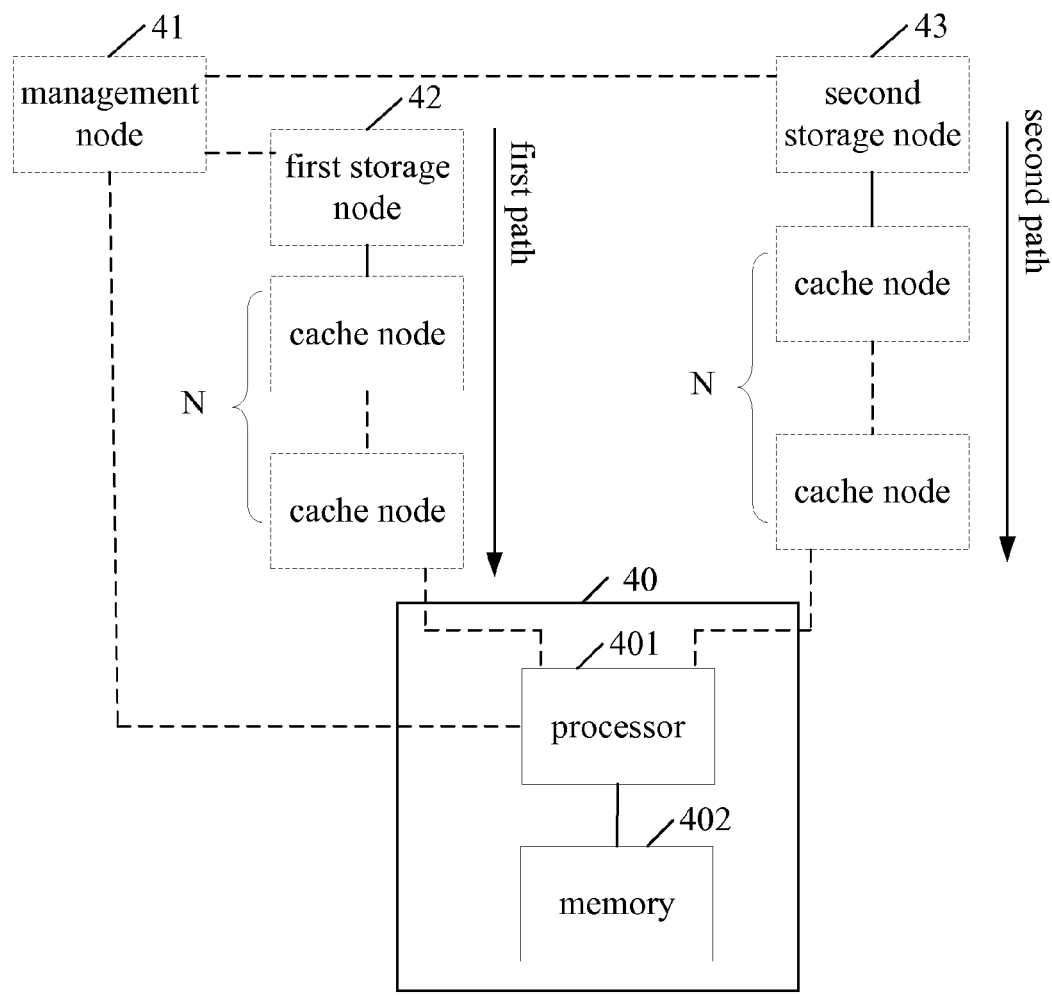
FIG. 8 is a schematic diagram of a structure of embodiment 2 of a user equipment of the present disclosure.

Please see FIG. 8. FIG. 8 is a schematic diagram of a structure of embodiment 2 of a user equipment of the present disclosure. As shown in the figure, the user equipment 40 includes a processor 401 and a memory 402.

The processor 401 is configured to send a first acquiring request used for requesting a target content to a management node 41, and receive a first probe packet sent by a first storage node 42 determined by the management node 41, where the first probe packet includes an identifier of a fragment of the target content and a shortest distance from the fragment to the user equipment 40 on the first path, and the first path is a path through which the first probe packet passes; meanwhile, receive a second probe packet sent by a second storage node 43 determined by the management node 41, where the second probe packet includes the identifier of the fragment of the target content and a shortest distance from the fragment to the user equipment 40 on the second path, and the second path is a path through which the second probe packet passes; determine an optimal path according to the shortest distance from the fragment to the user equipment 40 on the first path and the shortest distance from the fragment to the user equipment 40 on the second path, where the optimal path is a path of the first path and the second path; and send a second acquiring request used for acquiring the fragment through the optimal path.

The above-mentioned processing procedure implemented by the processor 401 is generally finished by a segment of program, the program is stored in the memory 402, when the user equipment 40 needs to perform the above-mentioned action, the program is scheduled into the processor 401, and the processor 401 finishes the processing. Of course, the above-mentioned processing procedure may also be finished by hardware.

Figure 9:
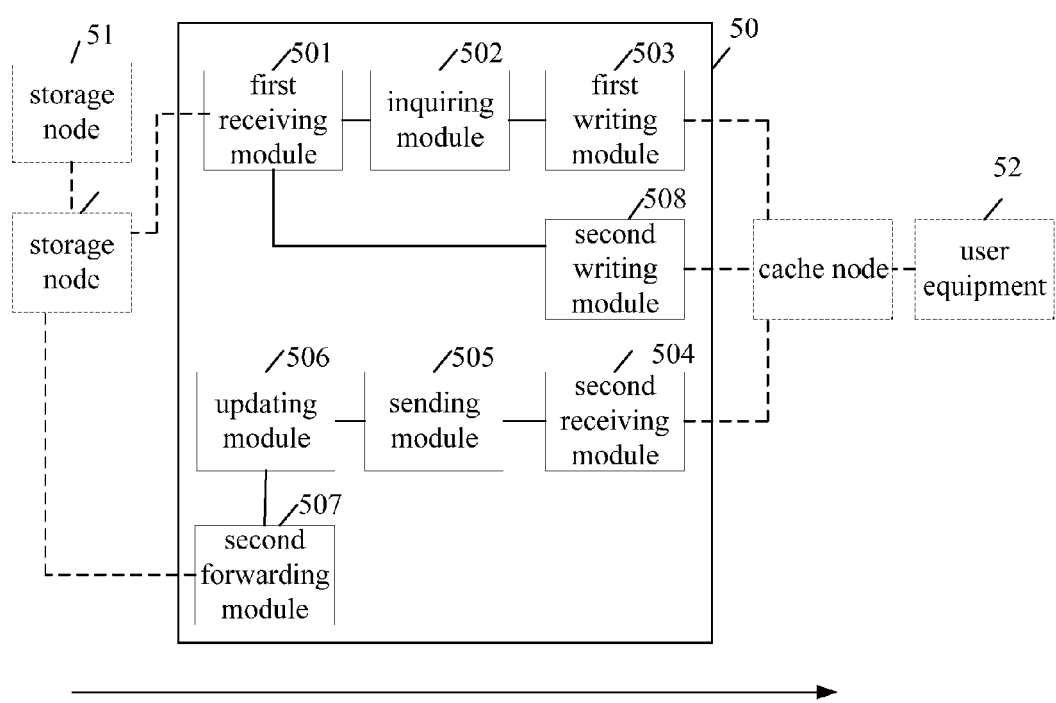
FIG. 9 is a schematic diagram of a structure of embodiment 1 of a cache node of the present disclosure.

The present disclosure further provides a cache node embodiment. Please see FIG. 9. FIG. 9 is a schematic diagram of a structure of embodiment 1 of a cache node of the present disclosure. As shown in the figure, the cache node 50 includes a first receiving module 501, an inquiring module 502, a first writing module 503, a second receiving module 504, a sending module 505, an updating module 506 and a second forwarding module 507.

The first receiving module 501 is configured to receive a probe packet from a storage node 51. The inquiring module 502 is configured to inquire whether a first fragment of a target content which the probe packet requests to probe is cached locally. The first writing module 503 is configured to, when the inquiring module 502 inquires that the first fragment is cached locally, write a new first distance in the probe packet, where the new first distance is a shortest distance from the first fragment to the cache node 50. The shortest distance from the first fragment to the cache node 50 is the sum of a product and an initial value, where the product is a product of the least routing and forwarding times which the fragment needs to experience to reach the cache node and a constant, and the constant could not be 0. The cache node 50 caches the first fragment, at this time, the first fragment may reach the cache node 50 without routing and forwarding, namely, the cache node 50 may be an initial point of the first fragment, and the shortest distance from the first fragment to the cache node 50 is a preset initial value. The initial value is a value set for the shortest distance of the fragment when the fragment is at the initial point, and the initial value may be 0 and may also be other numerical values.

Optionally, besides probing the shortest distance from the first fragment to user equipment 52, the probe packet may be further used for probing a quantity of first fragments on the path, then the first writing module 503 is specifically configured to write the new first distance and a new first quantity in the probe packet, where the new first quantity is the sum of an old first quantity carried in the probe packet and 1, and the first quantity is a quantity of first fragments.

Optionally, besides probing the shortest distance from the first fragment to the user equipment 52 and the quantity, the probe packet may be further used for probing a cache time of the first fragment on the path, then the first writing module 503 is specifically configured to write the new first distance, a new first quantity and a first cache time in the probe packet, where the new first quantity is the sum of an old first quantity carried in the probe packet and 1, the first quantity is a quantity of first fragments, and the first cache time is a time period when the cache node 50 caches a first fragment.

In the embodiment of the present disclosure, if the probe packet further probes a second fragment besides probing the first fragment, the cache node 50 further includes a second writing module 508. When the probe packet further requests to probe the second fragment and the cache node 50 does not cache the second fragment, the second writing module 508 is configured to write a new second distance in the probe packet, where the new second distance is a shortest distance from the second fragment to the cache node 50. The new second distance is the sum of an old second distance carried in the probe packet and a constant, the old second distance is a shortest distance from the second fragment to an upstream neighboring node of the cache node 50 on a path through which the probe packet passes along a downlink direction, and the downlink direction is a direction from the storage node 51 to the user equipment 52. The neighboring node is a node storing the second fragment and closest to the second fragment on the path. After the probe packet is updated, the cache node 50 sends the updated probe packet to a next node.

The second receiving module 504 is configured to receive a second acquiring request generated by a user equipment 52 according to the probe packet, where the second acquiring request includes a first fragment request identifier used for indicating that the first fragment is requested. The first fragment request identifier may be an identifier of the first fragment. The sending module 505 is configured to send the first fragment to the user equipment 52 according to the second acquiring request. The updating module 506 is configured to update the second acquiring request after the sending module 505 sends the first fragment. In the embodiment of the present disclosure, a manner of the updating module 506 updating the second acquiring request is: deleting the identifier of the first fragment in the second acquiring request; or, the cache node 50 sets the first fragment request identifier as invalid, for example, the identifier of the first fragment is marked for indicating that the first fragment has been sent to the user equipment 52.

In the embodiment of the present disclosure, the first receiving module receives the probe packet, and the first writing module and the second writing module update the probe packet, for enabling the probe packet to probe the shortest distance from the fragment to the user equipment, so that the user equipment may determine a optimal path from the shortest distance from the fragment to the user equipment and acquire the fragment from the optimal path, so as to reduce forwarding times of the fragment in the network, thus effectively reducing consumption of a bandwidth of the network and decreasing access delay of the user equipment.

Figure 10:
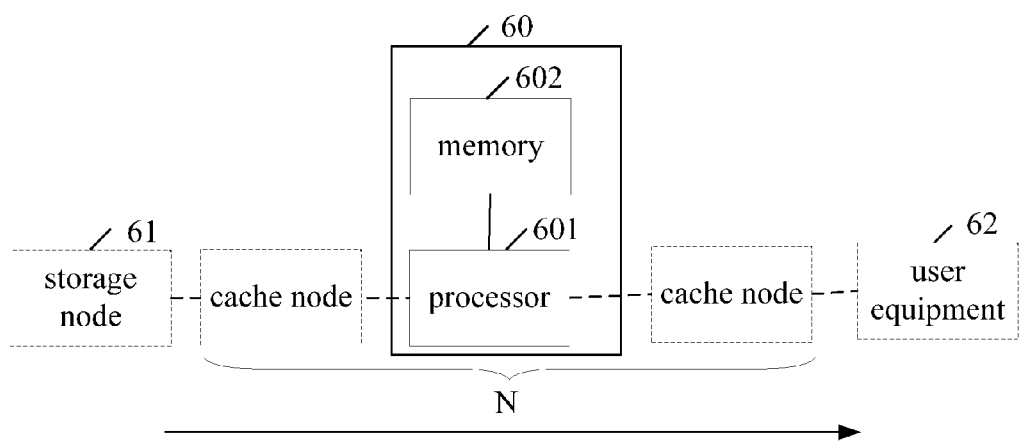
FIG. 10 is a schematic diagram of a structure of embodiment 2 of a cache node of the present disclosure.

Please see FIG. 10. FIG. 10 is a schematic diagram of a structure of embodiment 2 of a cache node of the present disclosure. As shown in the figure, the cache node 60 includes a processor 601 and a memory 602.

The processor 601 is configured to receive a probe packet from a storage node 61; inquire whether a first fragment of a target content which the probe packet requests to probe is cached locally; if the first fragment is cached, write a new first distance in the probe packet, where the new first distance is a shortest distance from the first fragment to the cache node 60; receive a second acquiring request generated by a user equipment 62 according to the probe packet; send the first fragment to the user equipment 62 according to the second acquiring request and update the second acquiring request; and forward an updated second acquiring request.

The above-mentioned processing procedure implemented by the processor 601 is generally finished by a segment of program, the program is stored in the memory 602, when the cache node 60 needs to perform the above-mentioned action, the program is scheduled into the processor 601, and the processor 601 finishes the processing. Of course, the above-mentioned processing procedure may also be finished by hardware.

In order that the reader may better understand the contents of the present disclosure, exemplary illustration will be given below from the perspective of system, where each example is an independent part and is free from mutual influence. Please see FIG. 11, FIG. 12, FIG. 13, FIG. 14 and FIG. 15. The system includes a management node 900, a storage node 910, a storage node 911, a storage node 912, a cache node 920, a cache node 921, a cache node 923, a cache node 924, a user equipment 940, a user equipment 941, a user equipment 942, a general routing node 930 and a general routing node 931. Of course, the storage nodes, the cache nodes and the general routing nodes listed above are merely used for conveniently illustrating the contents of the present disclosure, rather than limiting the numbers of the storage nodes, the cache nodes and the general routing nodes. The general routing node only has a forwarding function, the storage node is a router having a forwarding function and a storage function, the cache node is a router having a forwarding function and a cache function, and the storage capacity of the storage node is generally better than that of the cache node, but the access speed of the cache node is better than that of the storage node. Furthermore, it is assumed that all storage nodes store target contents C and B, the target content C includes target content fragments C1, C2, C3, C4, C5 and C6, the target content B includes target content fragments B1 and B2, the cache router may store three target content fragments, and the storage nodes have finished a registration request.

Example 1

Figure 11:
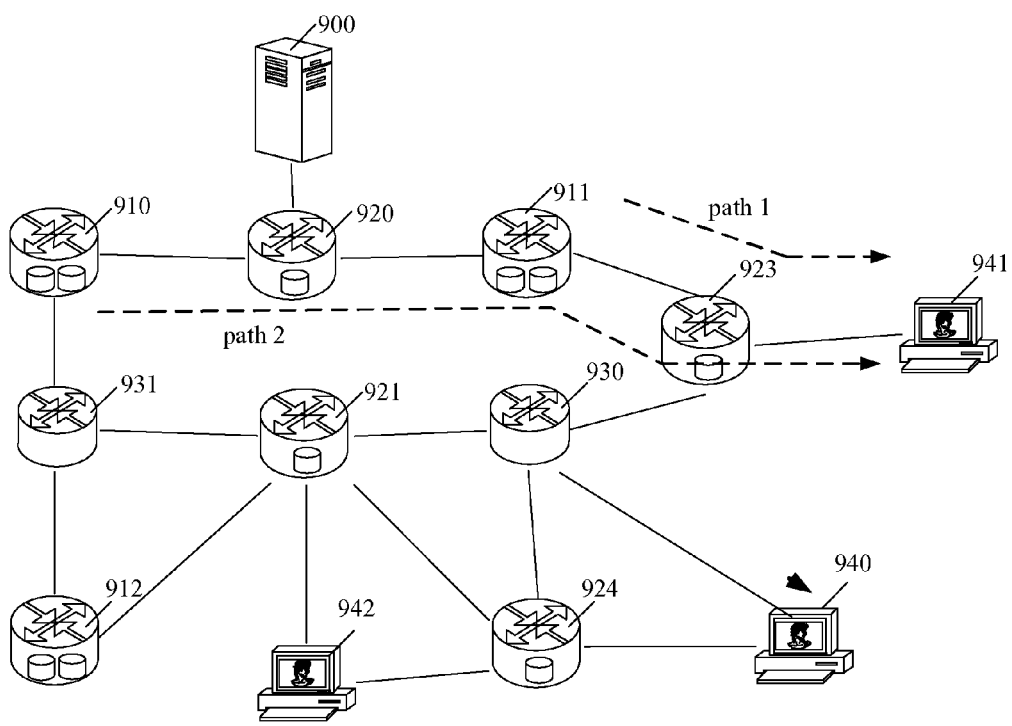
FIG. 11 is a schematic diagram of exemplary illustration of a content acquiring path in a first example of a method for acquiring a content of the present disclosure from the perspective of system.

Please see FIG. 11. It is assumed that all cache nodes in a local field do not store any data. The user equipment 941 requests the target content C from the management node 900.

The management node 900 selects the storage nodes 911 and 910, a path 1 and a path 2 by utilizing an anycast method in combination with a shortest path algorithm, and notifies the storage node 911 to send a probe packet 1 along the path 1 and notifies the storage node 910 to send a probe packet 2 along the path 2.

The cache nodes on the path 1 and the path 2 store no content, thus no updating needs to be performed on the probe packets.

The user equipment 941 receives the probe packet 1 and the probe packet 2 to acquire the following information.

On path 1, distances of all fragments of the target content are 2 and quantities are 1.

On path 2, distances of all fragments of the target content are 4 and quantities are 1.

According to a formula:

$$p_j^i = w_d^j\left(\frac{1}{d_j^i}\right) + w_n^j n_j^i + w_t^j\left(\frac{1}{t_j^i}\right) + c,$$

$$d_j^i \neq 0, t_j^i \neq 0$$

it is taken that $w_d^i = w_n^i = 1$, $c=0$, since the time is not recorded, $t_j^i = 0$ and is not calculated, the calculation results are:

$$p_1^i = 1.5, \quad i = 1, 2, \ldots, 6, \quad p_2^i = 1.25, \quad i = 1, 2, \ldots, 6,$$

$$\text{then } R^i = \arg\max_j(p_j^i) = 1, \quad i = 1, 2, \ldots, 6,$$

thus the user equipment 941 requests all target content fragments of the target content C from the path 1.

Since storing no content, the cache node 923 does not send any content to the user equipment 941 and forwards a target content fragment acquiring request, the storage node 911 sends all target content fragments of the target content C to the user equipment 941, when forwarding the target content fragments, the cache node 923 updates contents stored locally according to an LRU algorithm, and the cache node 923 finally stores the target content fragments C4, C5 and C6.

Example 2

Figure 12:
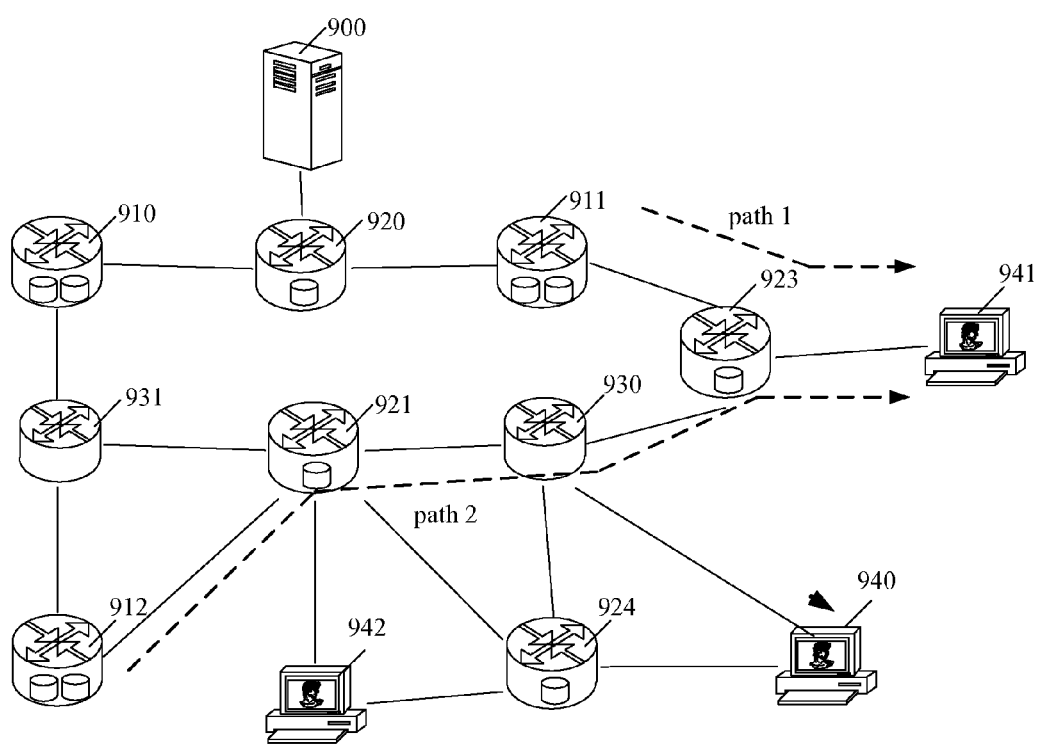
FIG. 12 is a schematic diagram of exemplary illustration of a content acquiring path in a second example of a method for acquiring a content of the present disclosure from the perspective of system.

Please see FIG. 12. It is assumed that the cache node 923 stores the target content fragments C4, C5 and C6, and the user equipment 941 requests the target content B.

The management node 900 selects the storage node 911, the storage node 912, a path 1 and a path 2, and notifies the storage node 911 to send a probe packet 1 and a probe packet 2 to the user equipment 941 along the path 1.

The cache nodes on the path 1 and the path 2 store no target content fragment of the target content B, thus not updating needs to be performed on the probe packets.

The user equipment 941 receives the probe packet 1 and the probe packet 2 to acquire the following information.

On path 1, distances of all fragments of the target content are 2 and quantities are 1.

On path 2, distances of all fragments of the target content are 4 and quantities are 1.

The calculation results of acquiring probabilities are the same as those in example 1, but multipath and load balancing principles may be further considered, the user equipment 941 requests the target content fragment B1 from the storage node 911 and requests the target content fragment B2 from the storage node 912.

The cache nodes on the path 1 and the path 2 store no target content fragment, thus sending no target content fragment to the user equipment 941, the storage node 911 sends the target content fragment B1 to the user equipment 941, the storage node 912 sends the target content fragment B2 to the user equipment 941, the cache node 921 and the cache node 923 update the contents stored locally, the cache node 921 stores the target content fragment B2, and the cache node 923 stores the target content fragments B1, B2 and C6.

Example 3

Figure 13:
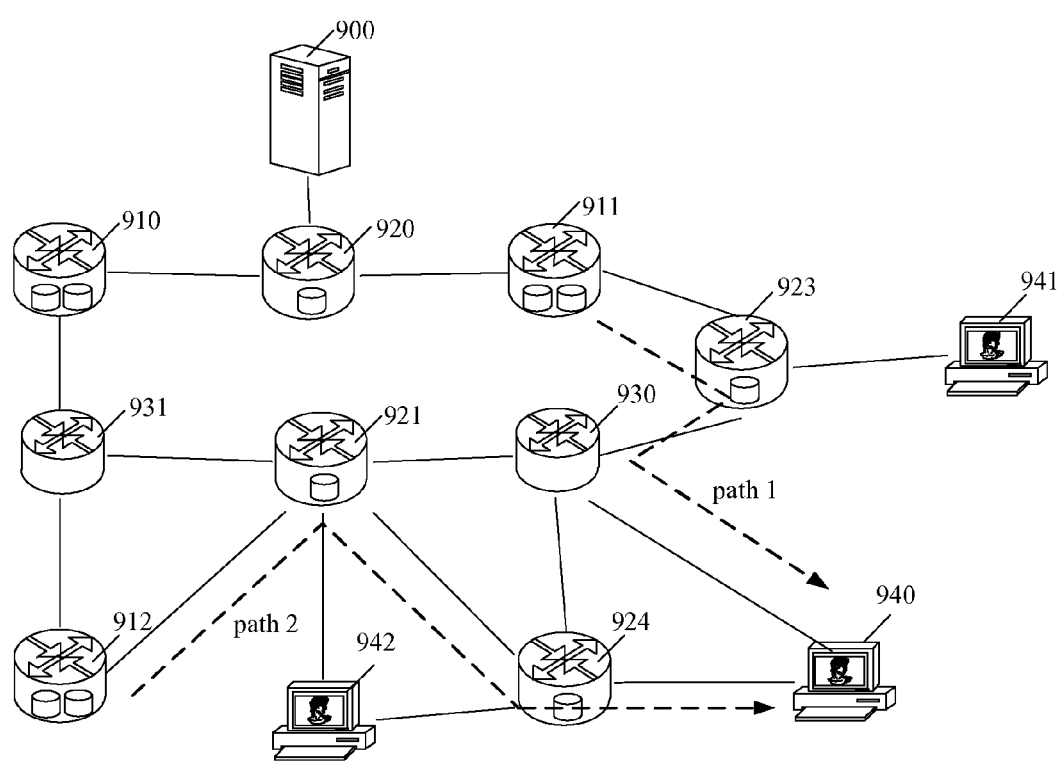
FIG. 13 is a schematic diagram of exemplary illustration of a content acquiring path in a third example of a method for acquiring a content of the present disclosure from the perspective of system.

Please see FIG. 13. It is assumed that the cache node 921 stores the target content fragment B2, the cache node 923 stores the target content fragments B1, B2 and C6, and the user equipment 940 requests the target content C.

The management node 900 selects the storage node 911, the storage node 912, a path 1 and a path 2, and notifies the storage node 911 to send a probe packet 1 and a probe packet 2 to the user equipment 940 along the path 1, and the probe packets may record related information by using a Bloom Filter data structure.

The cache node 923 and the cache node 921 respectively update the probe packet 1 and the probe packet 2.

The user equipment 940 receives the probe packet 1 and the probe packet 2 to acquire the following information.

The target content fragment C6 is stored on path 1.
No target content fragment is stored on path 2.
According to a formula $$p_j^i = 1 \bigg/ \left( \frac{w_d \sum_i d_j^i}{w_n \sum_i n_j^i} \right), \sum_i n_j^i \neq 0,$$

it is taken that $w_d = w_n = 1$, where the $d_j^i$ is a distance from the target content fragment i to the user equipment, the $n_j^i$ is a total quantity of the target content fragments i on the path j, $w_d$ and $w_n$ respectively refer to weights of the distance and a quantity of the target content fragments, the calculation results are $p_1^i = 0.4$, $i=1, 2, \ldots, 6$; $p_2^i = 0.333333$, $i=1, 2, \ldots, 6$, the multipath and load balancing principles are further combined, the user equipment 940 requests the target content fragments C4, C5 and C6 from path 1 and requests the target content fragments C1, C2 and C3 from path 2.

The cache node 611 sends C6 to the user equipment 940, the storage node 911 sends the target content fragments C4 and C5, the storage node 912 sends the target content fragments C1, C2 and C3, the cache node 911 updates the contents stored locally, the cache node 923 stores the target content fragments C4, C5 and C6, similarly, the cache node 921 and the cache node 924 store the target content fragments C1, C2 and C3.

Example 4

Figure 14:
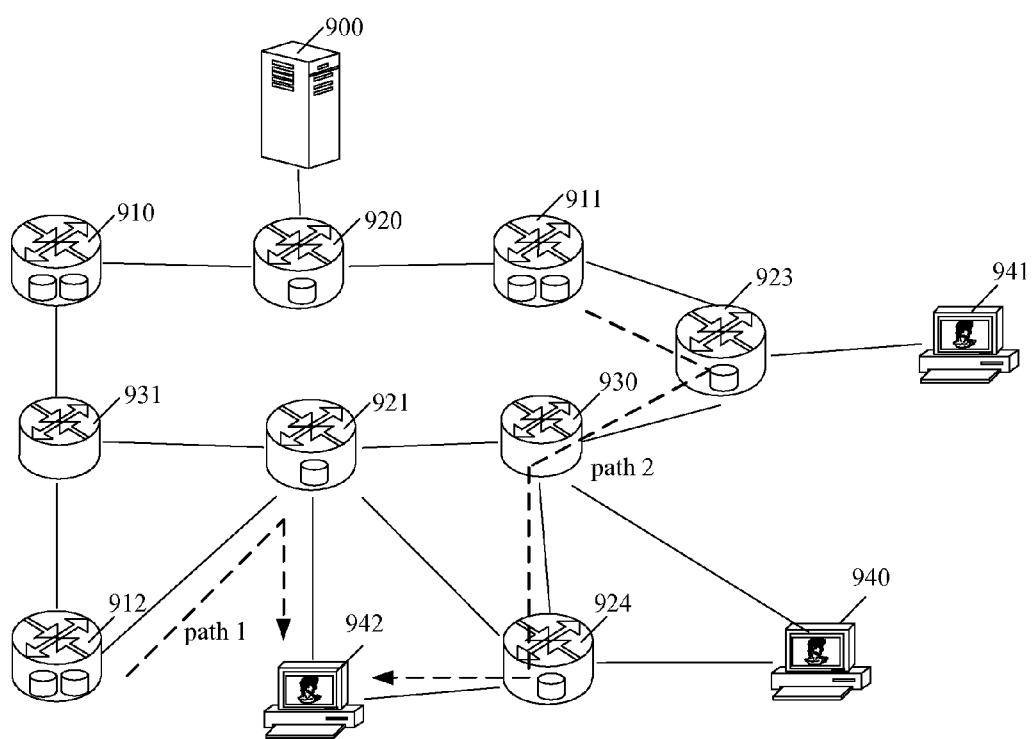
FIG. 14 is a schematic diagram of exemplary illustration of a content acquiring path in a fourth example of a method for acquiring a content of the present disclosure from the perspective of system.

Please see FIG. 14. It is assumed that the cache node 923 stores the target content fragments C4, C5 and C6, the cache node 921 and the cache node 924 store the target content fragments C1, C2 and C3, and the user equipment 942 requests the target content C.

The management node 900 selects the storage node 911, the storage node 912, a path 1 and a path 2, and notifies the storage node 911 to send a probe packet 1 and a probe packet 2 to the user equipment 942 along path 1, and the probe packets may record related information by using the Bloom Filter data structure.

The user equipment 942 receives the probe packet 1 and the probe packet 2 to acquire the following information.

The target content fragments C1, C2, C3, C4, C5 and C6 are stored on path 1.

The target content fragments C1, C2 and C3 are stored on path 2.

According to a formula $$p_j^i = 1 \bigg/ \left( \frac{w_d \sum_i d_j^i}{w_n \sum_i n_j^i} \right), \sum_i n_j^i \neq 0,$$

it is taken that $w_d = w_n = 1$, where the $d_j^i$ is a distance from the target content fragment i to the user equipment, the $n_j^i$ is a total quantity of the target content fragments i on the path j, $w_d$ and $W_n$ respectively refer to weights of the distance and a quantity of the target content fragments, the calculation results are $p_1^i = 1, 2, \ldots, 6$; $p_2^i = 0.333333$, $i=1, 2, \ldots, 6$, the multipath and load balancing principles are further combined, the user equipment requests the target content fragments C4, C5 and C6 from the path 1 and requests the target content fragments C1, C2 and C3 from the path 2.

The cache node 921 sends the target content fragments C2 and C3 (C1 has been replaced before the cache node receives the target content fragment acquiring request) to the user equipment 942, the storage node 912 sends the target content fragment C1, the cache node 923 sends the target content fragments C4, C5 and C6 to the user equipment 942, the cache node 921 and the cache node 924 update the contents stored locally, the cache node 923 and the cache node 924 store the target content fragments C4, C5 and C6, and the cache node 921 stores the target content fragments C1, C2 and C3.

Example 5

Figure 15:
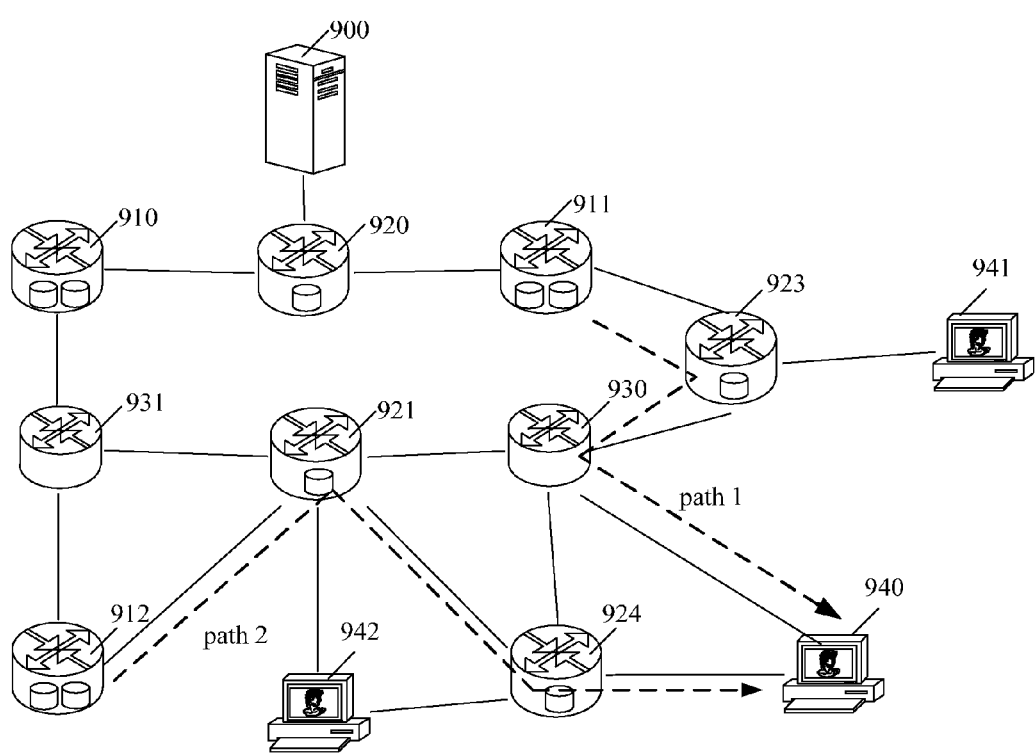
FIG. 15 is a schematic diagram of exemplary illustration of a content acquiring path in a fifth example of a method for acquiring a content of the present disclosure from the perspective of system.

Please see FIG. 15. It is assumed that the cache node 921 stores the target content fragments C1, C2 and C3 of the target content C, and the cache node 923 and the cache node 924 store the target content fragments C4, C5 and C6 of the target content C.

The user equipment 940 requests the target content C from the management node 900.

The management node 900 selects the storage node 911 and the storage node 912 to provide service by utilizing a K order anycast method according to the target content C and the address of the user equipment, and notifies the storage node 911 and the storage node 912 to respectively send a probe packet 1 and a probe packet 2 to the user equipment 940 along path 1 and path 2.

After receiving the probe packet 1, the cache node 923 inquires the information stored locally and finds that the target content fragments C4, C5 and C6 are stored locally and attaches quantities of the target content fragments C4, C5 and C6, information of distances to the user equipment or storage time information to the probe packet 1; similarly, the cache node 921 and the cache node 924 update the probe packet 2 according to information stored locally.

The user equipment 940 receives the probe packet 1 and the probe packet 2 to respectively acquire related information of the target content fragments stored in path 1 and path 2; if the time of the cache node 923 for storing the target content fragments is 2, the time of the cache node 921 for storing C2 and C3 is 2 and the time for storing C1 is 1, and the time of the cache node 924 for storing each target content fragment is 1.

The user equipment 940 determines the probability of acquiring each target content fragment from path 1 and path 2, where the calculation method of the probability is as follows:

Step S56: the user equipment 940 determines the probability of acquiring each target content fragment from path 1 and path 2, where the calculation method of the probability is as follows:

$$d_1^i = 2+3, n_1^i = 2, t_1^i = 2, i=4,5,6; d_1^i = 3, n_1^i = 1, i=1,2,3; \quad \text{path 1}$$

$$d_2^i = 1+3, n_2^i = 2, t_1^i = 1, i=4,5,6; \quad \text{path 2}$$

$$d_2^i = 2+3, n_2^i = 2, i=1,2,3; t_2^1 = 1, t_2^2 = t_2^3 = 2;$$

according to a formula:

$$p_j^i = w_d^i\left(\frac{1}{d_j^i}\right) + w_n^i n_j^i + w_t^i\left(\frac{1}{t_j^i}\right) + c,$$

$$d_j^i \neq 0, t_j^i \neq 0,$$

it is taken that $w_d^i = w_n^i = w_t^i = 1$, $c = 0$, the calculation results are: $p_1^i = 2.7$, $p_1^i = 4, 5, 6 = 1.333333$, $i=1, 2, 3$, $p_2^i = 3.25$, $i=4, 5, 6$, $p_2^i = 3.2$, $i=1$, $p_2^i = 2.7$, $i=2, 3$, and the multipath and load balancing principles may be further combined to request the target content fragments C1, C2 and C3 from path 1 and request the target content fragments C4, C5 and C6 from path 2.

The cache node 924 sends the target content fragments C4, C5 and C6 to the user equipment 940, the storage node 911 sends the target content fragments C1, C2 and C3 to the user equipment 940, the cache node 923 updates the contents stored locally, finally, the cache node 923 and the cache node 921 store the target content fragments C1, C2 and C3, and the cache node 924 stores the target content fragments C4, C5 and C6.

The management node selects different storage nodes and paths from the storage nodes to the user equipment for the user equipment by utilizing the K order anycast method, and notifies the selected storage nodes to send the probe packets along the selected paths, the probe packets carry shortest distances of the fragments on the paths, after receiving the probe packets, the user equipment determines an optimal path according to the shortest distances of the fragments on different paths and acquires the fragments from the optimal path to reduce forwarding times of the fragments in the network, thus effectively reducing consumption of a bandwidth of the network and decreasing access delay of the user equipment.

The foregoing descriptions are merely embodiments of the present disclosure, rather than limiting the patent scope of the present disclosure, any equivalent structures or equivalent flow variations made by utilizing the description and accompanying drawings of the present disclosure, or direct or indirect applications in other related technical fields, are all encompassed in the protection scope of the present disclosure.

What is claimed is:

1. A method for acquiring a content, comprising:
   receiving, by a cache node, a probe packet from a storage node;
   inquiring, by the cache node, whether a first fragment of a target content which the probe packet requests to probe is cached locally;
   if the first fragment is cached, writing, by the cache node, a new first distance in the probe packet, wherein the new first distance is a shortest distance from the first fragment to the cache node;
   receiving, by the cache node, a second acquiring request generated by a user equipment according to the probe packet, wherein the second acquiring request comprises a first fragment request identifier used for indicating that the first fragment is requested;
   sending, by the cache node, the first fragment to the user equipment according to the second acquiring request, and updating the second acquiring request; and
   forwarding, by the cache node, an updated second acquiring request.

2. The method according to claim 1, wherein the writing the new first distance in the probe packet, comprises:
   writing a preset initial value in the probe packet as the new first distance.

3. The method according to claim 1, wherein the writing, by the cache node, the new first distance in the probe packet, comprises:
   writing, by the cache node, the new first distance and a new first quantity in the probe packet, wherein the new first quantity is the sum of an old first quantity carried in the probe packet and 1, and the first quantity is a quantity of first fragments;
   or,
   writing, by the cache node, the new first distance, a new first quantity and a first cache time in the probe packet, wherein the new first quantity is the sum of an old first quantity carried in the probe packet and 1, the first quantity is a quantity of first fragments, and the first cache time is a time period when the cache node caches a first fragment.

4. The method according to claim 1, wherein when the probe packet further requests to probe a second fragment and the cache node does not cache the second fragment, the method further comprises:
   writing, by the cache node, a new second distance in the probe packet.

5. The method according to claim 4, wherein the new second distance is the sum of an old second distance carried in the probe packet and a constant, the old second distance is a shortest distance from the second fragment to an upstream neighboring node of the cache node on a path through which the probe packet passes along a downlink direction, and the downlink direction is a direction from the storage node to the user equipment.

6. The method according to claim 1, wherein the updating the second acquiring request, comprises:
   deleting, by the cache node, the first fragment request identifier;
   or,
   setting, by the cache node, the first fragment request identifier as invalid.

7. A cache node, comprising:
   a receiver, configured to receive a probe packet from a storage node;
   a processor, configured to inquire whether a first fragment of a target content which the probe packet requests to probe is cached locally, when inquiring that the first fragment is cached locally, write a new first distance in the probe packet, wherein the new first distance is a shortest distance from the first fragment to the cache node;
   the receiver is further configured to receive a second acquiring request generated by a user equipment according to the probe packet, wherein the second acquiring request comprises a first fragment request identifier used for indicating that the first fragment is requested;
   a sender, configured to send the first fragment to the user equipment according to the second acquiring request;

the processor is further configured to update the second acquiring request after the sender sends the first fragment; and the sender is further configured to forward an updated second acquiring request.

8. The cache node according to claim 7, wherein the new first distance is a preset initial value.

9. The cache node according to claim 7, wherein the processor is specifically configured to write the new first distance and a new first quantity in the probe packet, the new first quantity is the sum of an old first quantity carried in the probe packet and 1, and the first quantity is a quantity of first fragments;

or, write the new first distance, a new first quantity and a first cache time in the probe packet, wherein the new first quantity is the sum of an old first quantity carried in the probe packet and 1, the first quantity is a quantity of first fragments, and the first cache time is a time period when the cache node caches a first fragment.

10. The cache node according to claim 7, wherein the processor is further configured to write a new second distance in the probe packet, when the probe packet further requests to probe a second fragment and the cache node does not cache the second fragment, wherein the new second distance is a shortest distance from the second fragment to the cache node.

11. The cache node according to claim 10, wherein the new second distance is the sum of an old second distance carried in the probe packet and a constant, the old second distance is a shortest distance from the second fragment to an upstream neighboring node of the cache node on a path through which the probe packet passes along a downlink direction, and the downlink direction is a direction from the storage node to the user equipment.

12. The cache node according to claim 7, wherein the processor is specifically configured to delete the first fragment request identifier, or set the first fragment request identifier as invalid.

* * * * *